(12) United States Patent
Matsuzaki

(10) Patent No.: US 8,189,235 B2
(45) Date of Patent: May 29, 2012

(54) APPARATUS, METHOD AND PROGRAM PRODUCT THAT CALCULATES A COLOR BLENDING RATIO SO SECURITY DOTS REPRODUCED IN A MONOCHROME IMAGE ARE SUBSTANTIALLY UNDETECTABLE

(75) Inventor: Masanori Matsuzaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 12/498,777

(22) Filed: Jul. 7, 2009

(65) Prior Publication Data
US 2010/0007924 A1   Jan. 14, 2010

(30) Foreign Application Priority Data

Jul. 11, 2008   (JP) .................. 2008-181414

(51) Int. Cl.
*H04N 1/40* (2006.01)
*H04N 1/44* (2006.01)
*H04N 1/56* (2006.01)
*B41M 3/14* (2006.01)

(52) U.S. Cl. ........ 358/2.1; 358/3.28; 358/530; 283/114; 283/901

(58) Field of Classification Search ............ 358/1.9, 358/2.1, 3.24, 3.28, 500, 501, 518–521, 526, 358/530, 443, 448, 470; 382/100, 162, 167; 283/72, 113, 114, 901, 902

See application file for complete search history.

(56) References Cited

U.S. PATENT DOCUMENTS

| | | | |
|---|---|---|---|
| 4,978,226 A | 12/1990 | Moriya et al. | |
| 5,973,802 A | 10/1999 | Hirota et al. | 358/521 |
| 6,993,149 B2 * | 1/2006 | Brunk et al. | 382/100 |
| 7,046,402 B2 | 5/2006 | Watanabe | |
| 7,168,868 B2 * | 1/2007 | Uchida et al. | 358/3.28 |
| 8,056,821 B2 * | 11/2011 | Fan et al. | 235/494 |
| 2002/0005855 A1 | 1/2002 | Mehigan | |
| 2006/0072158 A1 | 4/2006 | Christie | |
| 2006/0092443 A1 | 5/2006 | Miyashita | |
| 2006/0159338 A1 | 7/2006 | Nako | |

FOREIGN PATENT DOCUMENTS

| | | |
|---|---|---|
| JP | 8-251427 | 9/1996 |
| JP | 3401977 | 4/2003 |
| WO | 2006/055493 | 5/2006 |

* cited by examiner

*Primary Examiner* — Scott A Rogers
(74) *Attorney, Agent, or Firm* — Fitzpatrick, Cella, Harper & Scinto

(57) ABSTRACT

The invention provides an image processing apparatus, an image processing method, a recording medium and a program capable of suppressing security dots from being reproducible visibly while enhancing reproduction of a color, in an original, specified by a user, in the process of forming a monochrome image from a color image. The image processing apparatus includes a unit for taking a color image, a unit for separating a color image into respective color elements, a unit for judging the security dots through the use of the separated data, and a unit that, when it is judged that security dots are included, recalculates the blending ratio through the use of the security dot judgment result to convert the color image into a monochrome image.

15 Claims, 15 Drawing Sheets

| FIG.13A |
| FIG.13B |

APPARATUS, METHOD AND PROGRAM PRODUCT THAT CALCULATES A COLOR BLENDING RATIO SO SECURITY DOTS REPRODUCED IN A MONOCHROME IMAGE ARE SUBSTANTIALLY UNDETECTABLE

BACKGROUND OF THE INVENTION

1. Field of the Invention

The present invention relates to an image processing apparatus, an image processing method, a recording medium and a program for obtaining an image and performing processing thereon.

2. Description of the Related Art

In a conventional image processing apparatus such as a color photocopier or a color MFP, when a color copy is performed, images of R, G and B are obtained through three channels by a scanner unit, the RGB images are converted into a CMYK image by a printer unit, and the CMYK image is printed out therefrom.

When a monochrome copy is made with a color photocopier, after RGB images are obtained by a scanner unit, the RGB images are blended at a specific blending ratio to produce a monochrome image, and the monochrome image is output through a printer unit. The wording "specific blending ratio" means here a ratio of brightness of the elements of the respective colors, is represented with a ratio of RGB values or the like, and is set at a ratio so as to fit to visual properties of human eyes.

However, if the blending ratio is fixed, when a specific color, the brightness of which tends to increase, is subjected to a monochrome conversion, there arises the following problem. That is, the brightness value of the color occasionally becomes close to the brightness value of a sheet of paper on which the image is output and therefore, the color becomes thinner or disappears when a monochrome copy is made.

In order to solve the above problem, Japanese Patent No. 3401977 discloses an art in the specification thereof, in which the blending ratio can be set desirably when producing a monochrome image from a color image.

However, in the above-mentioned conventional art, when security dots that are intended to be invisible are included in an original to be scanned, there arises a problem that the dots become visible. As an example, a case where yellow that can hardly be seen by human eyes is used for security dots, is given. When an original including characters of thin yellow with a blending ratio, which is set to fit to the visual properties of human eyes, is copied in a monochrome, frequently, characters of thin yellow color may not be reproduced on the monochrome image. Then, when a user changes the setting of the blending ratio so as to be able to produce a monochrome image having a thinner yellow, the thin yellow characters on the original can be reproduced recognizably for human eyes on a monochrome image.

However, when an original including yellow security dots is copied into a monochrome at a blending ratio that deepens the yellow of the security dots, the security dots, which are invisible in the original, may occasionally become visible. In this case, the purpose of the security dots is reduced.

As described above, in the conventional art, when the blending ratio is adjustable to produce a monochrome image from RGB image, the security dots intended to be invisible may become recognizable. Therefore, conventionally, there has been a problem that it is difficult that forming a monochrome image has both of the requirements: increase of reproducibility of color on an original and reduction of visibility of security dots.

An object of the invention is to provide an image processing apparatus, an image processing method, a recording medium and a program capable of suppressing security dots from being reproducible visibly while enhancing reproduction of a color in an original specified by a user, in the process of forming a monochrome image from a color image.

SUMMARY OF THE INVENTION

An image processing apparatus according to the present invention, comprises: a judgment unit for judging whether the color image includes security dots; a calculation unit for calculating a blending ratio to blend each color element of the color image when the judgment unit judges that security dots are included in the color image so that the security dots are reproduced such that they are substantially undetectable by the human eye when a monochrome image into which the color image is converted is output on a print medium; and a unit for converting the color image into a monochrome image at the blending ratio calculated by the calculation unit.

An image processing method according to the present invention is a method applied to an image processing apparatus, comprises the steps of: judging whether the color image includes any security dots; calculating a blending ratio to blend each color element of the color image according to the color of the security dots judged to be included in the color image so that the security dots are reproduced such that they are substantially undetectable by the human eye when a monochrome image into which the color image is converted is output on a print medium; and converting the color image into a monochrome image at the calculated blending ratio.

According to the invention, the image processing apparatus, the image processing method, a recording medium and a program capable of, in monochrome image forming processing from a color image, inhibiting security dots from being reproducible visibly, while increasing the reproducing performance of a color specified by a user in an original, are provided.

Further features of the present invention will become apparent from the following description of exemplary embodiments (with reference to the attached drawings).

DESCRIPTION OF THE EMBODIMENTS

Now, best modes for carrying out the invention will be described below with reference to the drawings. The constitution used in the description below is intended for exemplification only; but not intended to limit the scope of the invention.

Embodiment 1

First of all, a first embodiment of the invention will be described. The first embodiment describes a technique applied to an image processing apparatus capable of specifying the blending ratio for performing monochrome scanning. This technique judges whether security dots are included in an original, and when it is judged that security dots are included, the blending ratio is calculated again.

Figure 1:
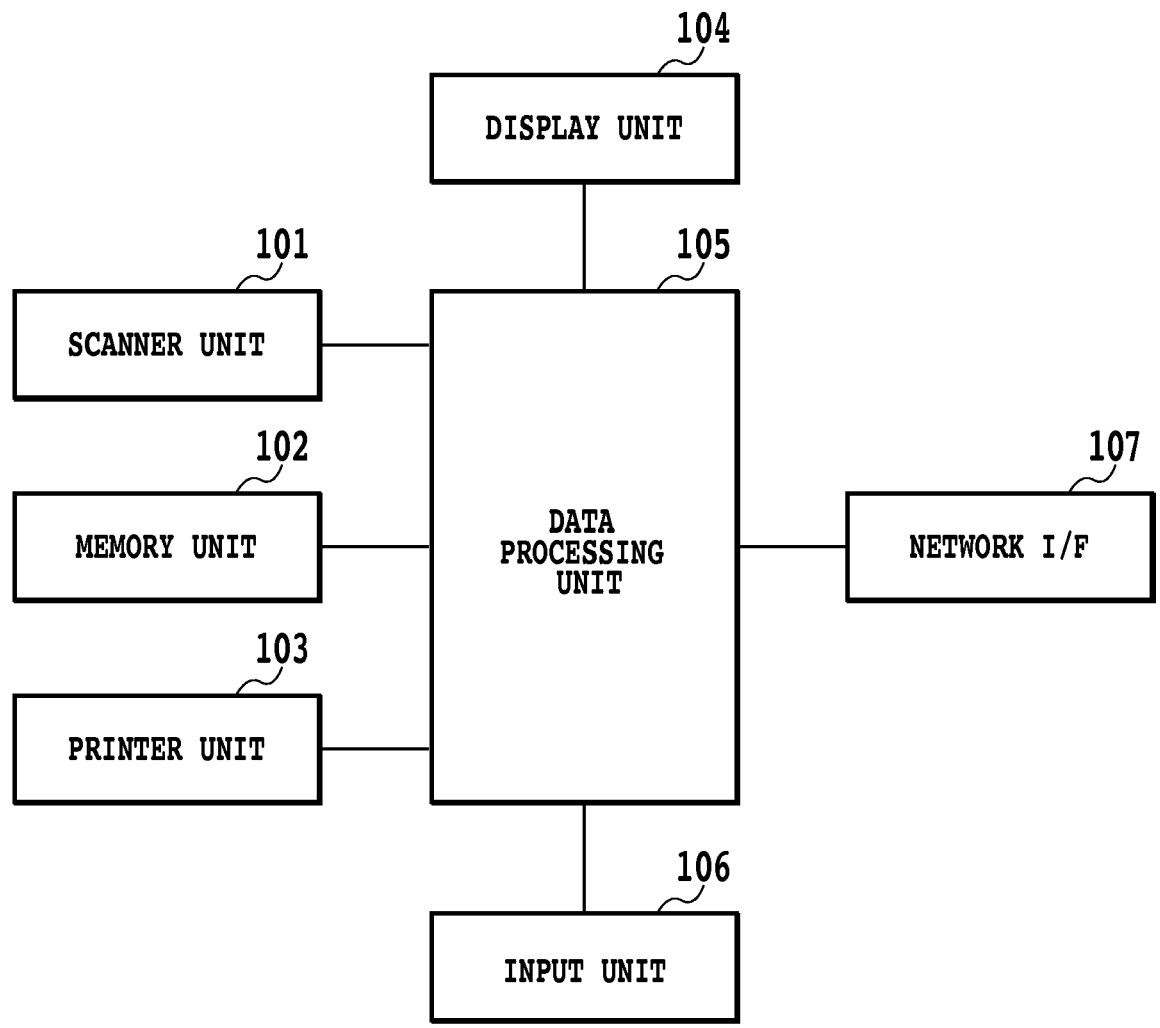
FIG. 1 illustrates a configuration of an MFP according to the invention.

FIG. 1 illustrates a configuration of an MFP, as an example of a configuration of an image processing apparatus according to the embodiment. A scanner unit 101 is a scanner including an auto document feeder. The scanner unit 101 functions as a color image-obtaining unit. The scanner unit 101 illuminates an image on a bundle of or a piece of original by a light source (not shown) and forms the image reflected by the original on a solid-state image-sensing device such as a CCD sensor or the like through a lens. The scanner unit 101 then obtain raster signals as image signals read from the solid-state image-sensing device. For example, in the color MFP, three types of color filters are attached to the solid-state image-sensing devices, thereby, an RGB color image is obtained.

A printer unit 103 outputs images. When a copy function of the MFP is executed, a data processing unit 105 performs image processing to convert the image signals obtained by the scanner unit 101 into recording signals. The converted signals are output in order for the printer unit 103 to form an image on a sheet of paper. The printer unit 103 is ordinarily adapted as an output unit that outputs image data on a sheet of paper through the use of color materials of C, M, Y and K. An image is formed from the data processed by the data processing unit and output therefrom.

Instructions such as copy or the like are given by a user to the MFP through an input unit 106 including key operation unit and the like mounted on the MFP. A sequence of operations of the MFP is controlled by a control unit (not shown) mounted on the data processing unit 105 in accordance with the instructions given by the user through the input unit 106.

On the other hand, a display unit 104 displays the sate of input operation and the images during processing. A memory unit 102 has an area capable of storing data such as images taken by the scanner unit 101. The memory unit 102 also stores various types of data such as processing data used by the data processing unit 105, data processed by the data processing unit 105 and various types of control programs.

A network I/F 107 is an interface for connecting to a network. The network I/F 107 enables the MFP to receive images from an external unit such as a PC (personal computer), perform processing for the images through the use of the data processing unit 105 and print out the images through the use of the printer unit 103. In addition, the data read by the scanner unit 101 and processed by the data processing unit 105 can be transmitted to a PC or another MFP via the network I/F 107.

Figure 14:
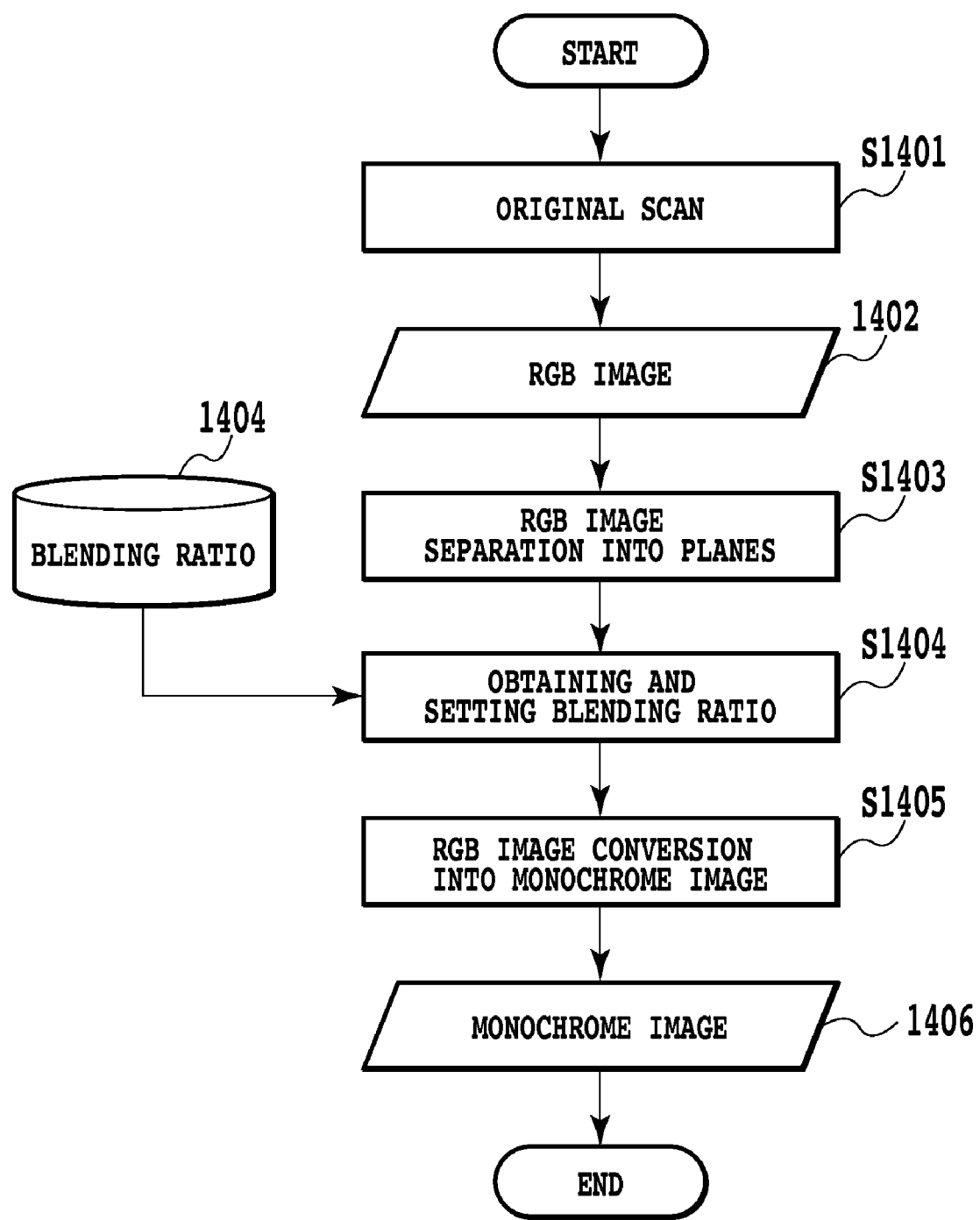
FIG. 14 illustrates a processing flow to convert a color image to a monochrome image performed in a conventional image processing apparatus.

FIG. 14 illustrates a processing flow to produce a monochrome image through the use of a conventional image processing apparatus such as a color MFP. A control unit provided to a data processing unit 105 reads a program for performing a processing shown in FIG. 14 stored in a memory unit 102 and executes the program to control the processing.

A scanner unit 101 scans an original first at step S1401 to obtain an RGB image 1402. That is, the control unit transmits a scan command of the original to the scanner unit 101 to cause the scanner unit 101 to read the original to thereby obtain the RGB image 1402.

Subsequently, at S1403, a fixed blending ratio 1404 is obtained and set. At S1405, the RGB image 1402 is subjected to a monochrome conversion to produce a monochrome image 1406.

The blending ratio 1404 is held in the memory unit 102, and the processing from step S1403 to S1405 is performed by the data processing unit 105.

After producing the monochrome image as described above, in the case of a copy operation, after performing brightness to density conversion and image forming processing, the image is output to the printer unit 103. In the case of transmission processing, the monochrome image is transmitted through the use of the network I/F 107.

Figure 2:
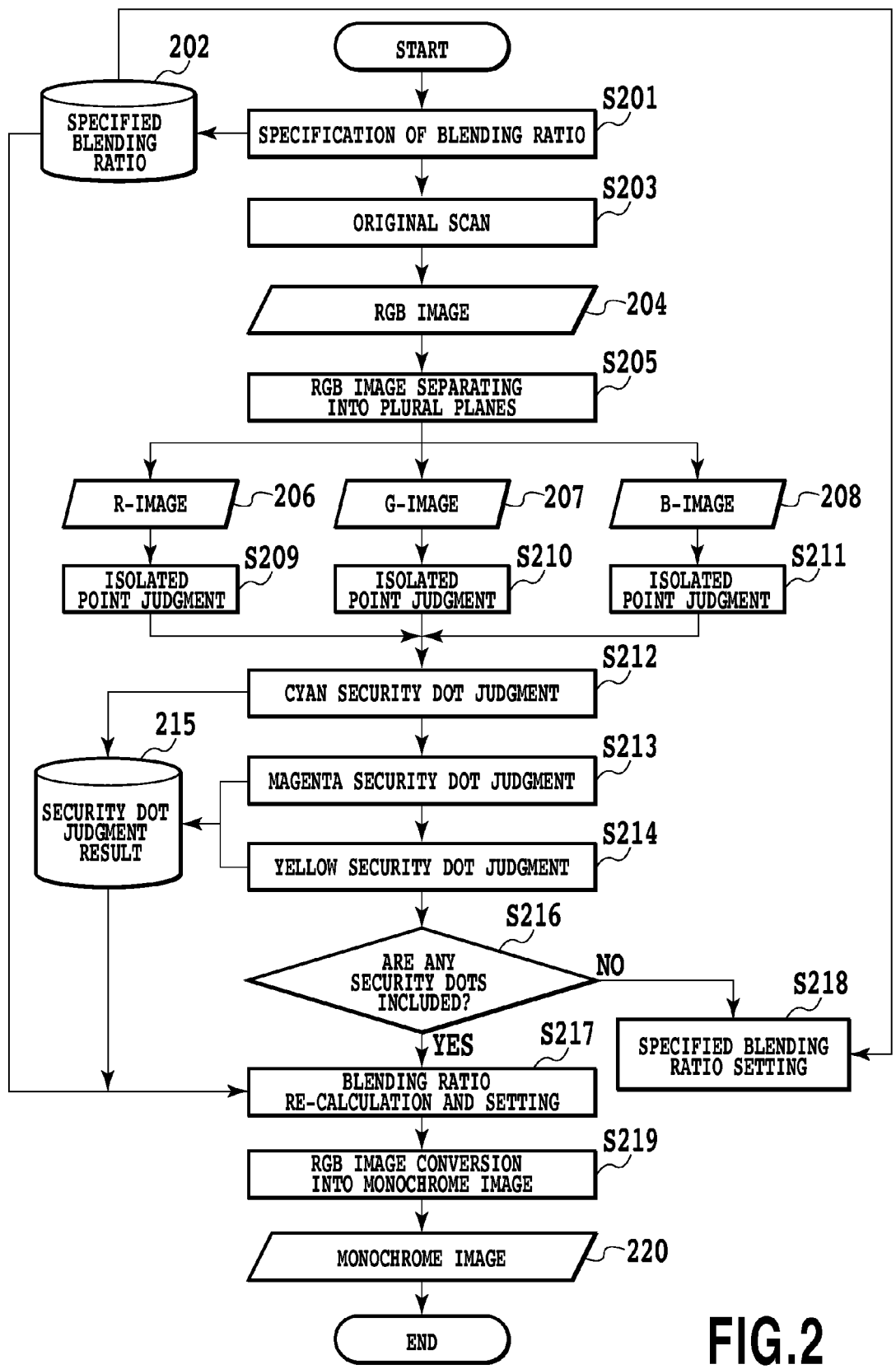
FIG. 2 illustrates a processing flow according to a first embodiment of the invention.

Now, embodiments according to the invention will be described. FIG. 2 illustrates a processing flow performed in the image processing apparatus according to a first embodiment of the invention. A control unit provided in the data processing unit 105 reads a program for performing the processing shown in FIG. 2 stored in the memory unit 102 and executes the program to control the processing.

First of all, a blending ratio is specified at step S201. When the data processing unit 105 receives a command from the display unit 104 and the input unit 106, this process is started and the specified blending ratio 202 is held in the memory unit 102. As for the specifying method of the blending ratio, any method such as directly specifying the ratio or specifying information of a color or the like may be employed. Subsequently, an original is scanned through the use of the scanner unit 101 to obtain an RGB image 204 at step S203. That is, the control unit causes the scanner 101 to read the original to thereby obtain the RGB image 204.

The following processing is performed by the data processing unit 105, and the created data is held by the memory unit 102.

At S205, the RGB image 204 is separated into planes of the respective color elements to obtain an R-image 206, a G-image 207 and B-image 208. Isolated point judgment is performed on each of the images; i.e., on the R-image 206 at step S209, on the G-image 207 at step S210 and on the B-image 208 at step S211. The isolated point judgment is a processing to judge whether any isolated point is included in the image data. When any isolated point is found, coordinate information and signal information of the isolated point is obtained and stored in the memory unit 102.

Figure 3:
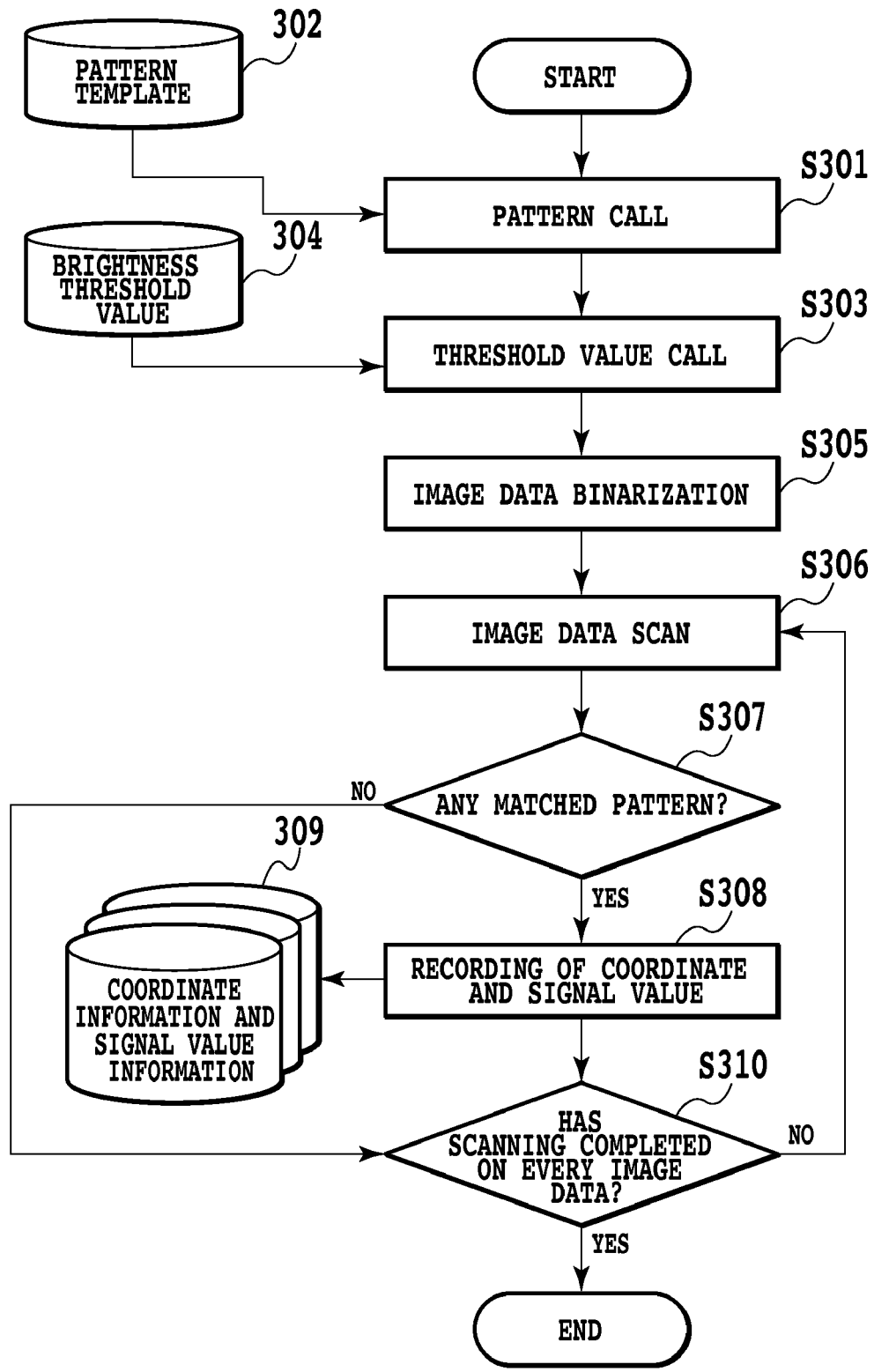
FIG. 3 illustrates a flow of isolated point judgment processing according to the first embodiment of the invention.
Figure 4A:
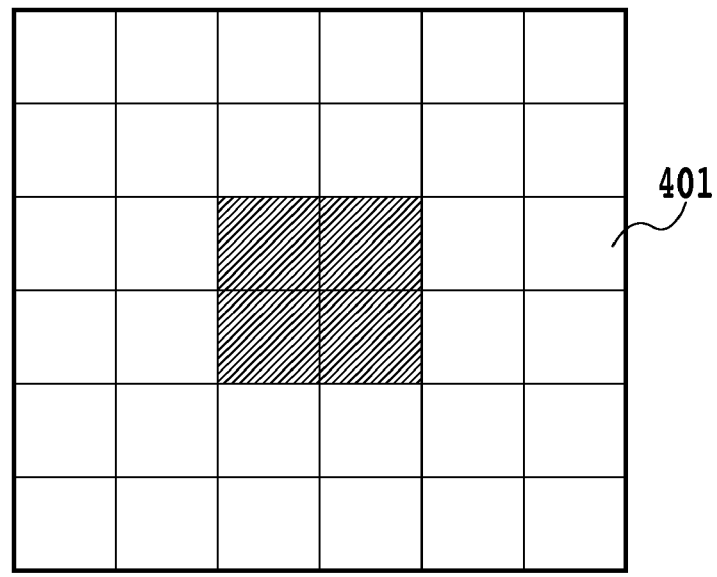
FIG. 4A illustrates an example of patterns used for isolated point judgment processing according to the first embodiment of the invention.
Figure 4B:
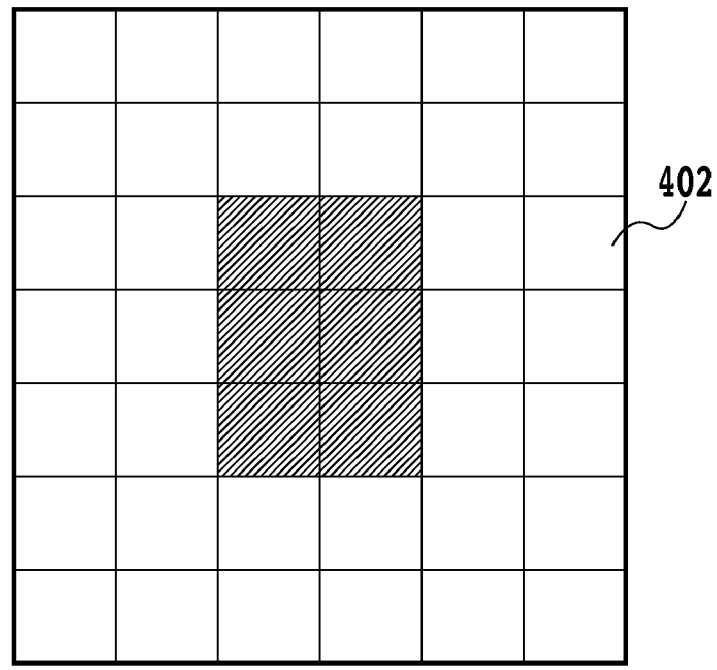
FIG. 4B illustrates an example of patterns used for isolated point judgment processing according to the first embodiment of the invention.

The isolated point judgment is described in detail referring to FIG. 3, FIG. 4A and FIG. 4B. FIG. 3 illustrates a flow of the isolated point judgment processing. The control unit provided in the data processing unit 105 controls the isolated point judgment processing. The control unit reads a program for performing the processing shown in FIG. 3 stored in the memory unit 102 and executes the program.

A pattern is called first from a pattern template 302 at step S301. FIG. 4A and FIG. 4B illustrate an example of the pattern template 302. Reference numerals 401 and 402 in FIG. 4A and FIG. 4B denote a pattern of an isolated point, respectively. Reference numeral 401 denotes an example of a template for checking whether any isolated points of 2×2 are included in a space of 6×6. Reference numeral 402 denotes an example of a template for checking whether any isolated points of 2×3 are included in a space of 6×7. Since each of the security dots is a small dot and the size thereof is limited, the number of the templates is finite.

Subsequently, a brightness threshold value 304 is called at step S303. The image data is binarized through the use of the called brightness threshold value 304 at step S305. In the case of step S209, the image data of R-image 206 is binarized. In the case of step S210, the image data of G-image 207 is binarized. In the case of step S211, the image data of B-image 208 is binarized.

The image data binarized at step S305 is scanned (step S306), and then it is judged whether the binarized image data matches the pattern template called at step S301 (step S307).

When no matched pattern template is found at step S307, the control unit determines whether every image data has been scanned (step S310). When any image data remains without being scanned, the process returns to step S306 to thereby repeat the above processing. When any matched pattern template is found at step S307, the point where the pattern template matches at step S308 is recorded as coordinate information of the isolated point. At the same time, a signal value on the coordinate of the point is also recorded. These recorded data are stored as the coordinate information and signal value information 309 in the memory unit 102.

After recording the data as described above, a determination is made at step S310. And when every image data has been scanned, the processing is terminated. When the scan has not been completed on every image data, the process returns to step S306 to thereby repeat the scanning of the image data. Since the processing is performed on every image data as described above, in many cases, there are plural types of coordinate information and signal value information 309.

Through the processing as described above with reference to FIG. 3, isolated point judgment processing is performed on each image data, which are separated at step S209, S210, or S211.

After that, on the coordinate information and the signal information of the isolated point obtained by the isolated point judgment processing, cyan security dot judgment is made at step S212; magenta security dot judgment is performed at step S213; and Yellow security dot judgment is performed at step S214.

The security dot judgment is a processing in which security dots are detected from the isolated point found by the isolated point judgment processing and subsequently, whether the detected security dots are any of cyan, magenta and Yellow, is determined. The security dot judgment processing functions as a security dot determiner. The result of the security dot judgment is held as a security dot judgment result 215. The security dot judgment result 215 includes, for example, coordinate information of the detected security dots, signal information (for example, brightness information), color (cyan, magenta, or yellow) information, and the like.

Figure 5:
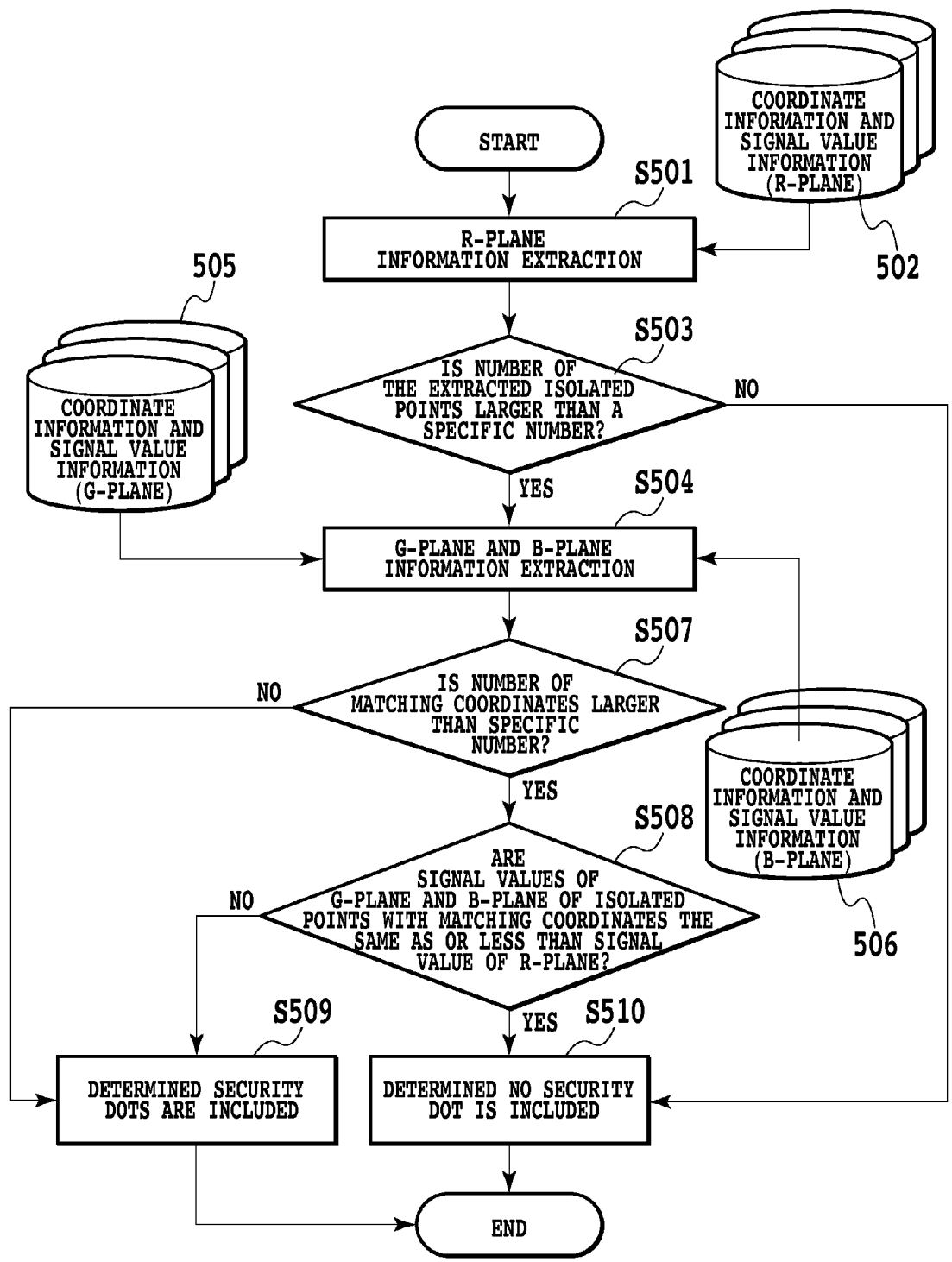
FIG. 5 illustrates a flow of security dot judgment processing according to the first embodiment of the invention.

A security dot judgment method will be described with reference to FIG. 5. FIG. 5 illustrates a flow of security dot judgment processing regarding cyan. The control unit provided to the data processing unit 105 controls the processing. The control unit reads a program for performing the processing shown in FIG. 5, stored in the memory unit 102, and executes the program.

First of all, the information (502) about the isolated points in the R-plane (R-image 206) is extracted (step S501). In the isolated point judgment at step S209, the information (502) on isolated point of the R-plane is extracted from the coordinate information and signal value information 309 stored in the memory unit 102. It is judged whether the number of the extracted isolated points is larger than a certain number (step S503). The "certain number" is a threshold of the number of the isolated points for judging whether any security dots are included in the image data.

When the number of the extracted isolated points is larger than the certain number, at step S504, the information about the isolated points of the G-plane and the B-plane is extracted from the coordinate information and signal value information (G-plane) 505 and the coordinate information and signal value information (B-plane) 506. At step S503, when the number of the isolated points is smaller than the certain number, it is determined that no security dots are included at step S510, and the processing is terminated. The "certain number" may be determined in any manner by changing the number based on the scanned size or the like. For example, when the scan size is larger, the "certain number" may be increased; and when the scan size is smaller, the "certain number" may be reduced.

At step S507, the coordinate values of the isolated points in the G-plane and B-plane extracted at step S504 and the coordinate values of the isolated points in the R-plane extracted at step S501 are compared to judge if matching coordinates exceed a certain number. The "certain number" is a threshold that is used for judging if the isolated points included in the separated image data are the security dots of cyan. The threshold is expressed by a number of the coordinates of the matching isolated points. When the number of the matching coordinates is smaller than the certain number, it is determined that the isolated points are the security dots of cyan. Therefore, at step S509, it is determined that security dots are included in the image data, and the processing is terminated.

At step S507, when it is judged that the number of the matching coordinates is larger than the certain number, it is determined whether the signal values of the G-plane and the B-plane of the isolated points that have matching coordinates are the same as or less than the signal value of the R-plane (step S508).

That is, the coordinate information and the signal value information (R-plane) 502 of the isolated points are obtained first at step S501. Subsequently, the signal value information of the isolated points of the G-plane and B-plane having the coordinate information corresponding to the obtained coordinate information of the isolated points of the R-plane is obtained at step S504. And it is determined whether the obtained signal value of the R-plane is the same as the obtained signal values of the G-plane and B-plane.

The wording "same" means here that signal values (for example, brightness values expressed by signal values) are the same (or same level). When the signal value is the same or less, the isolated point is determined as the isolated point of a color other than cyan, and at step S510, it is determined that no security dots are included. When the signal values of the G-plane and B-plane are larger than the signal value of the R-plane, the isolated point is determined as a part of the color image of cyan, and at step S509, it is determined that security dots are included. Since it is adapted here that the smaller signal value represents the darker, and the larger signal value represents the brighter; the signal value is defined as "same or less than signal value of R-plane". However, when the relationship between the signal value and the brightness is inversed, it is defined as "same or more than signal value of R-plane".

The cyan security dot judgment has been described above. In the case of magenta security dot judgment, the R-plane is replaced with the G-plane, and the G-plane is replaced with the R-plane. For example, the plane information extracted at step S501 is the information of the G-plane; and the plane information extracted at step S504 is the information of the R-plane and B-plane. In the case of yellow security dot judgment, the R-plane is replaced with the B-plane, and the B-plane is replaced with the R-plane.

After performing the security dot judgment on each separated image data at step S212, step S213 and step S214 as described above, it is determined whether or not any security dots are included (step S216). When it is judged that no security dots are included, the blending ratio 202 specified at step S201 is set (step S218). At step S219, the RGB image 204 is converted into a monochrome image 220 at the specified blending ratio 202. When it is judged that security dots are included, the blending ratio is re-calculated by using the specified blending ratio 202 and the security dot judgment result 215 and the calculated blending ratio is set (step S217). The RGB image 204 is converted into the monochrome image 220 by using the blending ratio (step S219), and the processing is terminated.

Figure 6:
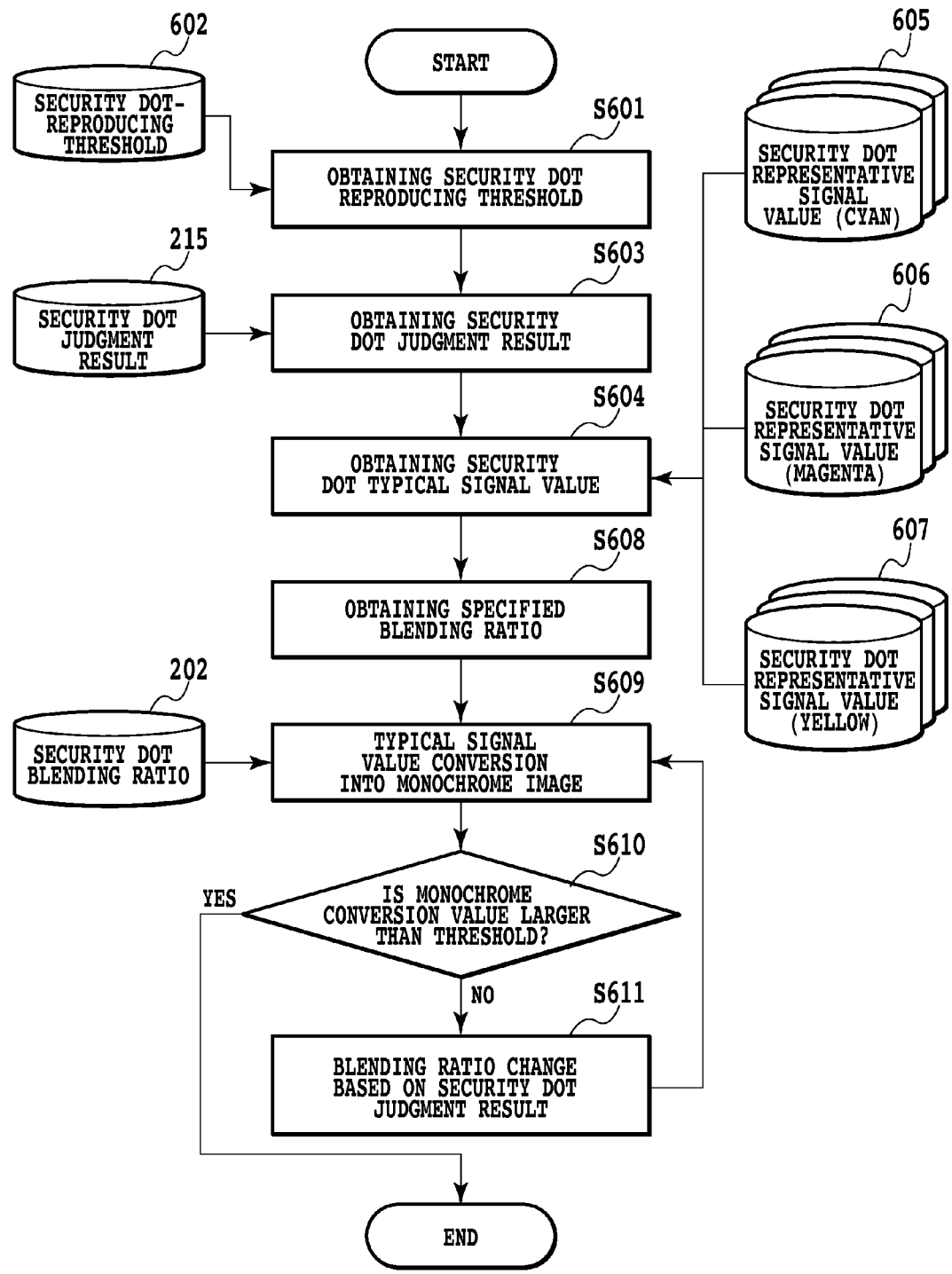
FIG. 6 illustrates a flow of blending ratio re-calculation processing according to the first embodiment of the invention.

The re-calculation process of the blending ratio is described referring to FIG. 6. FIG. 6 illustrates a flow of the blending ratio re-calculating process. The control unit provided in the data processing unit 105 controls the re-calculating process. The control unit reads a re-calculation program shown in FIG. 6 stored in the memory unit 102 and executes the program.

First of all, a security dot-reproducing threshold value 602 is obtained at step S601. The security dot-reproducing threshold here is a threshold at which the security dots are not reproduced on a copy of the monochrome image output by the printer unit 103. The threshold is expressed through the use of a brightness value of a specific brightness. It is defined here that the smaller signal value represents the darker; and the larger signal value represents the brighter. The security dot-reproducing threshold is preset and stored in a storage like the memory unit 102. Also, the security dot-reproducing threshold may be set to a desired value by the user. For example, the security dot-reproducing threshold may be set to a brightness value at which the security dots are hard to be reproduced to the extent of being hard to be recognized (security dots are hard to be reproduced).

Subsequently, the security dot judgment result 215 is obtained at step S603. At step S604, a security dot representative signal value is obtained. The security dot representative signal value is a signal value indicating a typical color of the security dots included in the color image. The security dot representative signal value is used for calculating the blending ratio as described later. As the security dot representative signal values according to the embodiment, a reference numeral 605 representing cyan, a reference numeral 606 representing magenta, and a reference numeral 607 representing yellow are provided. The security dot representative signal values are signal values, which are previously obtained by reading originals of single color of cyan, magenta and yellow with the scanner respectively, and are stored in a storage like the memory unit 102. Since the color tone of cyan, magenta and yellow differs depending on the color material or the like, plural types of originals are prepared to read the same with the scanner and plural representative signal values are stored. Needles to say, by averaging obtained signal values, one representative signal value may be stored.

Subsequently, the blending ratio 202 specified by a user is obtained (step S608), and the security dot representative signal value is subjected to monochrome conversion at the specified blending ratio 202 (step S609). At that time, through the use of the security dot judgment result 215, the kind of representative signal value to be subjected to the monochrome conversion is selected. That is, with reference to the security dot judgment result 215, a security dot representative signal value corresponding to the color of the security dots is extracted from the security dot representative signal values of the respective colors obtained at step S604. And the security dot representative signal value is subjected to the monochrome conversion. For example, when the security dot judgment result 215 is cyan, the security dot representative signal value (cyan) 605 is subjected to the monochrome conversion. When the security dot judgment result 215 is magenta, the security dot representative signal value (magenta) 606 is subjected to the monochrome conversion. When the security dot judgment result 215 is yellow, the security dot representative signal value (yellow) 607 is subjected to the monochrome conversion. Needless to say, when plural kinds of security dots are determined in the security dot judgment result 215, plural representative signal values are subjected to the monochrome conversion. For example, when both of cyan and magenta are determined in the security dot judgment result 215, the security dot representative signal value (cyan) 605 and the security dot representative signal value (magenta) 606 are subjected to the monochrome conversion. When all security dots are judged, all representative signal values are subjected to the monochrome conversion.

The control unit judges whether the monochrome conversion value (signal value after the monochrome conversion) obtained at step 609 is greater than or equal to the security dot reproducing threshold value 602 (step S610). When the monochrome conversion value is greater than or equal to the security dot-reproducing threshold 602 value, the control unit determines that the monochrome conversion value of the security dots has a brightness at which the security dots are not reproduced; and the processing is terminated.

When the monochrome conversion value is smaller than the security dot-reproducing threshold value 602, the blending ratio is changed corresponding to the security dot judgment result 215 (step S611). That is, the blending ratio is changed corresponding to the type of the color of the security dots included in the security dot judgment result 215 so that the monochrome conversion value of the representative signal values is greater than or equal to the security dot-reproducing threshold value 602. For example, in the case that the security dot judgment result 215 is cyan, a method, in which the blending ratio of R is reduced; or the blending ratio of G and B is increased, is employed. Thereby, the brightness values of dots read from the security dots become greater, and the dots can be reproduced invisibly. In the case where the security dot judgment result 215 is magenta, a method, in which the blending ratio of G is reduced; or blending ratio of R and B is increased, is employed. In the case where the security dot judgment result 215 is yellow, a method, in which the blending ratio of B is reduced; or the blending ratio of R and G is increased, is employed. After changing the blending ratio as described above, the process returns to step S609, and the typical value is subjected to the monochrome conversion by using a new blending ratio, and the above processing is repeated.

According to the embodiment, the security dots of cyan, magenta and yellow are subjected to the judgment. However, security dots of other colors may be used. Further, procedures for the isolated point judgment, the security dot judgment and the re-calculation of blending ratio are not limited to the procedures according to the embodiment but any procedures may be employed.

As described above, the image processing apparatus according to the first embodiment performs the processing shown in FIGS. 2-6. In this processing, the color image 204, which is obtained (S203) by the scanner unit 101 as the color image-obtaining unit, is separated into a plurality of planes for each color element (S205), and it is judged whether any security dots are included in the separated images (S216). When it is judged that security dots are included, the blending ratio is calculated through the use of the security dot judgment result 215 and the security dot-reproducing threshold value 602 (S217, S601 to S611). That is, a blending ratio of the RGB image 204, at which the security dots are hard to be reproduced on the image after monochrome conversion of the color image, is calculated through the use of the color type information of the security dots of the security dot judgment result 215 and the information of the security dot-reproducing threshold value 602. Subsequently, the RGB image 204 is converted into a monochrome image 220 at the calculated blending ratio (S219).

When it is judged that no security dots are included, the RGB image 204 is converted into a monochrome image 220 at the specified blending ratio 202 (second blending ratio).

Therefore, according to the first embodiment, when scanning a color original to form a monochrome image through the use of an image processing apparatus mounted with a color scanner, the reproducing performance of a color specified by a user included in the original can be increased. Even when security dots intended to be invisible is included in the original, by dynamically changing the blending ratio so that the color of the security dots included in the color original is hard to be reproduced on the monochrome image.

Embodiment 2

Now, a second embodiment of the invention will be described below. According to the second embodiment, without requiring a user to specify the blending ratio, the blending ratio is determined based on image data obtained from a scanned original. In the first embodiment, when the security dot judgment judges that security dots are included, the blending ratio is re-calculate through the use of a blending ratio specified by a user via the input unit 106 or the like. The second embodiment describes a method in which the similar processing is applied relative to the blending ratio determined based on the image data obtained from a scanned original.

Figure 7:
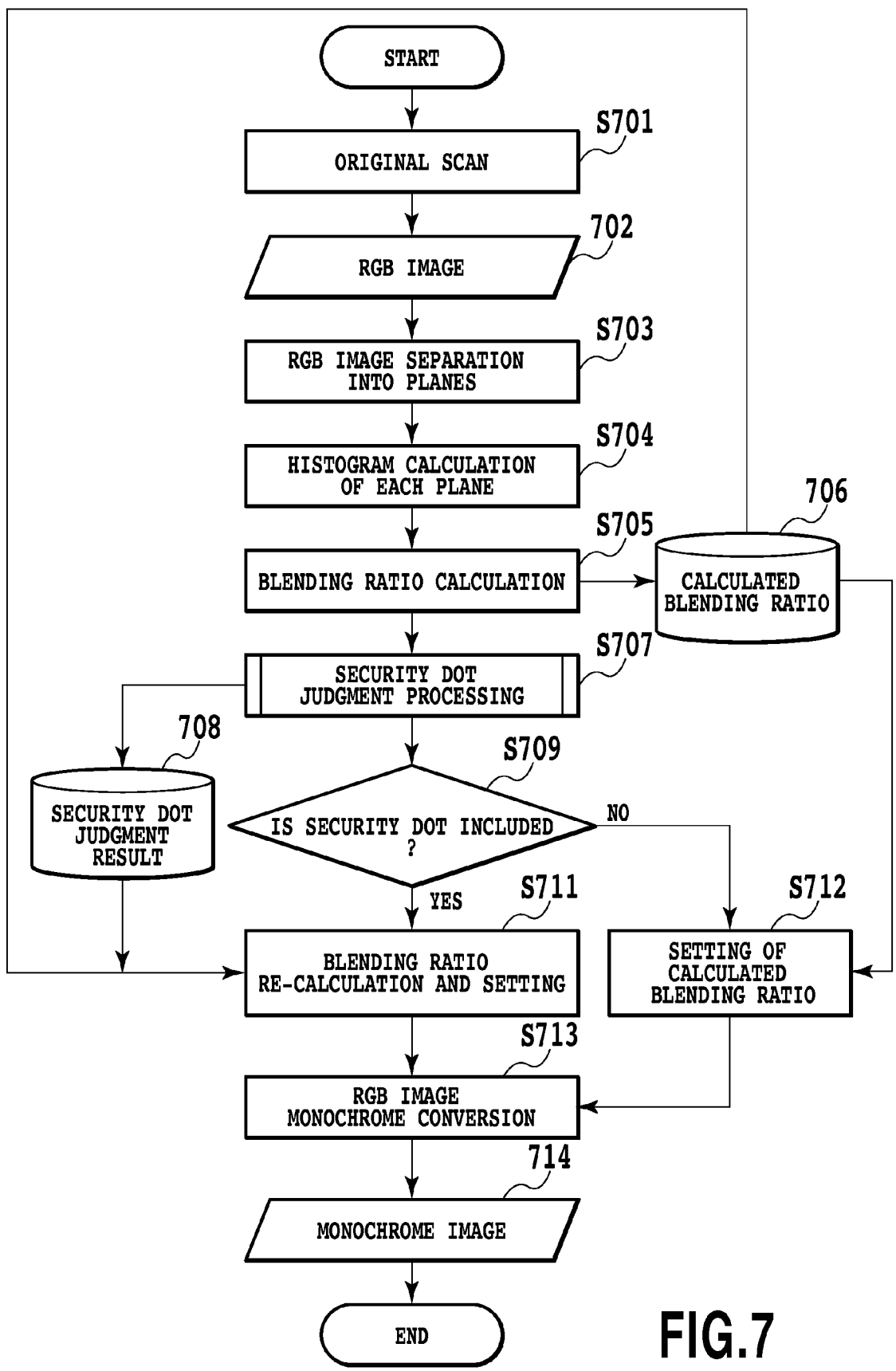
FIG. 7 illustrates a processing flow according to a second embodiment of the invention.

FIG. 7 illustrates a processing flow according to the second embodiment. The control unit provided in the data processing unit 105 controls the processing. The control unit reads a program for executing a process shown in FIG. 7, stored in the memory unit 102 and executes the program.

Like the first embodiment, the scanner unit 101 scans an original first to thereby obtain an RGB image 702 (step S701). That is, the control unit transmits an original scan command to the scanner unit 101 to cause the scanner unit 101 to read the original to thereby obtain the RGB image 702.

The data processing unit 105 performs the following processing. The obtained RGB image is separated into respective planes like an R-plane, a G-plane, and a B-plane (step S703). A histogram of each plane is calculated (step S704). Through the use of the histogram calculated by the processing at step S703 and S704, the control unit judges what element of R-element, G-element or B-element is included most in the image. In the elements, the blending ratio of the element that is included most in the image is calculated first (i.e., at a higher ratio) (step S705). That is, the blending ratio is calculated through the use of the histogram calculated by the processing at step S703 and S704. Thereby, the blending ratio corresponding to the RGB elements of the RGB image 702 read by the scanner unit 101 is calculated. The memory unit 102 holds the calculated blending ratio 706.

The image data is subjected to the security dot judgment processing, and a security dot judgment result 708 is output (step S707). The security dot judgment processing at step S707 is the same as the processing from step S205 to step S214 in FIG. 2 in the first embodiment.

It is determined whether any security dots are included in the image (step S709). When it is judged that no security dots are included in the image (step S709: No), the blending ratio 706 calculated at step S705 is set as the blending ratio which is used for the monochrome conversion described below (step S712). When it is judged that security dots are included (step S709: Yes), the blending ratio is calculated again and is set (step S711). The processing at step S711 is the same as the processing at step S217 in FIG. 2. After completing step S711, the RGB image is subjected to the monochrome conversion at the blending ratio set at step 712 to thereby generate a monochrome image 714 (step S713).

According to the second embodiment, the RGB image is analyzed through the use of the histogram, and the blending ratio is calculated through the use of the analysis result. However, any other analyzing method may be employed.

As described above, the image processing apparatus according to the second embodiment performs the processing as shown in FIG. 7. In this processing, the image (702) scanned from the original is analyzed (S703 and S704), and based on the analysis result, the blending ratio is calculated (S705).

Therefore, according to the second embodiment, when scanning a color original to form a monochrome image through the use of the image processing apparatus mounted with a color scanner, the reproduction of a specific color in the original can be enhanced. Even when any security dots intended to be invisible are included in the original, by dynamically changing the blending ratio based on the analysis result obtained by the above-described method, the dots are suppressed from being reproducible visibly. Furthermore, by determining the initial blending ratio based on the image data, the reproduction of a specific color in the original can be enhanced without causing a user to input any blending ratio or information relevant via through the input unit or the like.

Embodiment 3

A third embodiment of the invention will be described below. In the third embodiment, it is judged whether a determined blending ratio can be achieved at blending accuracy inherent to a device (image processing apparatus). When it is judged as impossible, the blending ratio is calculated again. The wording "blending accuracy" means here the information about the accuracy of the blending ratio that can be achieved by the image processing apparatus.

According to the first embodiment and the second embodiment, a security dot judgment is performed, and when it is judged that any security dots are included, the blending ratio is calculated again through the use of a predetermined blending ratio. In the third embodiment, it is judged whether the determined blending ratio can be produced at the blending accuracy inherent to the image processing apparatus, and then, when it is impossible, a blending ratio closest to the determined blending ratio in the possible blending ratios is calculated.

Figure 8:
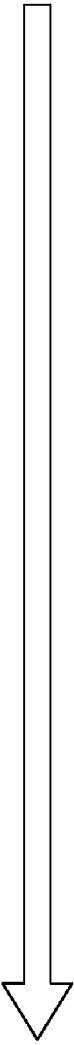
FIG. 8 illustrates an example of blending accuracy and possible blending ratio according to a third embodiment of the invention.

Before describing the third embodiment, the blending accuracy is described. Table 801 in FIG. 8 illustrates an example of blending accuracy and blending ratios possible at that accuracy. When the blending accuracy is 3 bits, the accuracy is expressed by decimal number 8; in the case of 4 bits, the accuracy is expressed by decimal number 16; and in the case of 5 bits, the accuracy is expressed by decimal number 32. The blending ratio is distributed to R, G and B so that the sum thereof matches the number of bits. That is, in the case of 3 bits, the sum of the blending ratios of R, G and B is 8; in the case of 4 bits, the sum of the blending ratios of R, G and B is 16; and in the case of 5 bits, the sum of the blending ratios of R, G and B is 32.

As shown in table 801, the larger the bit number of the blending accuracy becomes, the larger the number of combinations of possible blending ratios becomes. For example, the ratio of 15:10:7 is possible in the case of 5 bits, but the ratio is impossible in the case of 3 bits. Therefore, even when the blending ratio is determined by the above-described methods, the blending ratio may be impossible depending on the blending accuracy inherent to the image processing apparatus.

Figure 9:
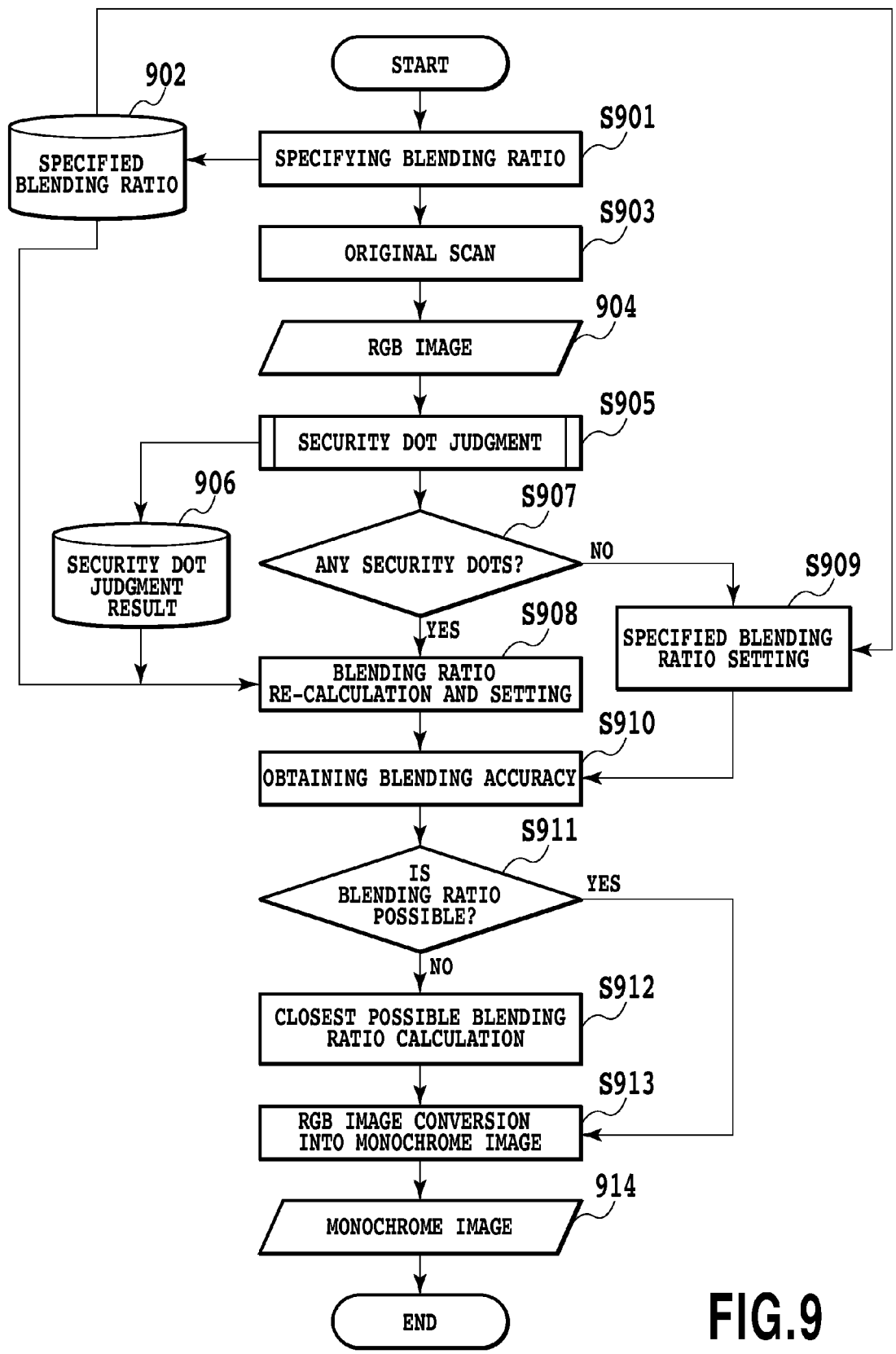
FIG. 9 illustrates a processing flow according to the third embodiment of the invention.

FIG. 9 illustrates a processing flow according to the third embodiment. The control unit provided to the data processing unit 105 controls the process. The control unit reads a program for executing the process shown in FIG. 9 stored in the memory unit 102 and executes the program.

The security dot judgment at step S905 is the same as the processing from step S205 to step S214 in the first embodiment shown in FIG. 2. Therefore, the processing flow from the specification of the blending ratio at step S901 to the setting of the specified blending ratio at step S909 is the same as that from step S201 to step S218 in FIG. 2. The processing after step S910 is performed by the data processing unit 105.

After determining the blending ratio at the above step (S908 or S909), a blending accuracy inherent to the device is obtained at step S910. The information about the blending accuracy inherent to the device is stored in a storage like the memory unit 102. The information of the blending accuracy obtained here may have any format like the blending accuracy shown in the table 801 in FIG. 8.

Subsequently, at step S911, it is judged whether the determined blending ratio is possible for the device based on the obtained blending accuracy. When the blending ratio is possible for the device (S911: Yes), the RGB image is converted into a monochrome image 914 (step S913). When the blending ratio is impossible for the device (S911: No), a blending ratio the value of which is the closest to the determined blending ratio in the possible blending ratios for the device is calculated (step S912). The RGB image is subjected to the monochrome conversion at the blending ratio calculated at step S912 to thereby produce the monochrome image 914 (step S913).

According to the third embodiment, the acquisition of the blending accuracy inherent to the device and the determination whether the set blending ratio is possible, were performed after the setting of the blending ratio. However, the above may be performed at the same time when the blending ratio is specified at step S901, or the blending ratio is calculated again at step S908. Also, like the second embodiment, the calculation method of the blending ratio according to the third embodiment may be applied to the processing for determining the blending ratio based on the image data scanned from the original.

As described above, the image processing apparatus according to the third embodiment performs the processing shown in FIG. 9. According to this processing, it is judged whether the blending ratio set at step S908 or S909 is possible for the device at the obtained blending accuracy (S911). When it is judged that the blending ratio is impossible (S911: No), the blending ratio, which is the closest to the determined blending ratio in the blending ratios that are possible for the device, is calculated (step S912).

Now, an example of a calculation method of a blending ratio which is the closest to the determined blending ratio will be described below. A lowest common multitude between a total value of the blending ratios possible for the device and the total value of the determined blending ratios is calculated to normalize the respective blending ratios. And a difference between all of the blending ratios possible for the device and the determined blending ratio is calculated. A blending ratio, which has the smallest sum of the absolute values of the difference, is calculated as the blending ratio which is the closest to the determined blending ratio.

For example, it is assumed that a blending ratio possible for the device is 3 bits, and the determined blending ratio is (R:G:B)=(1:10:1). Since the total value of the blending ratio possible for the device is 3 bits, the total value is 8; and the total value of the determined blending ratio is 12. In this case, since the lowest common multitude is 24, the determined blending ratio after normalization is (2:20:2). On the other hand, all of the blending ratios, which can be calculated within a range of 3 bits, are obtained; and are normalized so that the total value is 24.

After normalizing as described above, between the determined blending ratio and all of the blending ratios possible for the device, the sum of the absolute values of the difference is calculated; and the smallest blending ratio is obtained. In the example of 3 bits, (1:6:1) is the blending ratio in which the sum of the absolute values of the differences is the smallest, and is obtained as the blending ratio which is the closest.

Therefore, according to the third embodiment, when scanning a color original to form a monochrome image, through the use of the image processing apparatus mounted with the color scanner, the reproduction of a specific color in the original can be enhanced. At that time, even when the original includes security dots intended to be invisible, by dynamically changing the blending ratio, the dots can be suppressed from being reproducible visibly. Furthermore, when the blending accuracy inherent to the device is checked and when a blending ratio which is impossible to achieve is set, a blending ratio closest to a desired blending ratio in the blending ratios possible for the device is calculated, and the monochrome image is formed at the calculated blending ratio. Therefore, even when a blending ratio which is impossible to achieve is set, the monochrome image can be formed at an appropriate blending ratio.

Embodiment 4

Now, a fourth embodiment will be described below. In the fourth embodiment, the blending ratio for each pixel is changed through the use of a security dot judgment result. In the first embodiment, the second embodiment and the third embodiment, when the security dot judgment judges that the security dots are included, the blending ratio is calculated again through the use of a predetermined blending ratio; and the calculated blending ratio is applied to the entire of the image to thereby form an image. The embodiment 4 describes a processing in which, when it is judged that security dots are included, the blending ratio for each pixels are changed through the use of the security dot judgment result.

Figure 10:
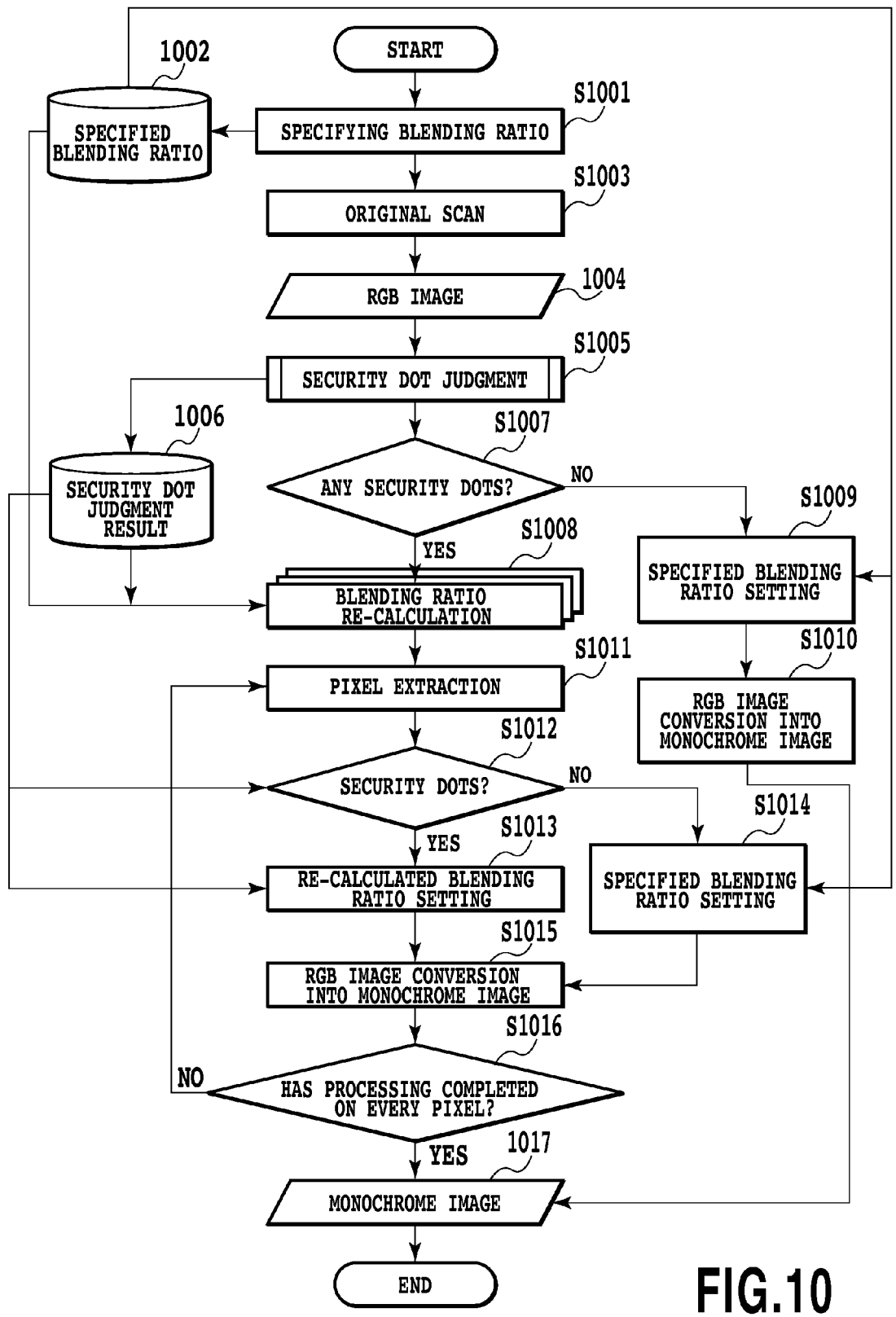
FIG. 10 illustrates a processing flow according to a fourth embodiment of the invention.

FIG. 10 illustrates a processing flow according to the fourth embodiment of the invention. The control unit provided in the data processing unit 105 controls the processing. The control unit reads a program for executing a process shown in FIG. 10 stored in the memory unit 102 and executes the program.

The security dot judgment at step S1005 is the same as the processing from step S205 to step S214 shown in FIG. 2 in the first embodiment. Therefore, the processing flow from the specification of the blending ratio at step S1001 to the setting of the blending ratio specified at step S1009 is the same as the processing flow from step S201 to step S218 in the first embodiment.

In the security dot judgment result 1006, not only the information (security dot Y/N information) concerning the existence of security dots in the respective colors, but also coordinate position information of the security dots is also stored. Also, in the re-calculation of the blending ratio at step S1008, plural kinds of blending ratios can be calculated. For example, each of the blending ratios can be calculated for each of cyan security dot, magenta security dot and yellow security dot respectively. Needless to say, like the above embodiments, only one kind of blending ratio may be calculated. The processing after step S1010 is performed in the data processing unit 105.

When it is judged that no security dots are included at step S1007, the blending ratio 1002 specified at step S1009 is set; and the RGB image 1004 is subjected to monochrome conversion at step S1010 to thereby produce a monochrome image 1017.

In the above embodiments, after the security dots are judged and the blending ratio is re-calculated, the monochrome conversion is performed by applying specific blending ratio to the entire of the image data. On the other hand, in the fourth embodiment, after performing the re-calculation of the blending ratio at step S1008, pixels are extracted from the RGB image 1004 at step S1011.

Through the use of the security dot Y/N information of the respective colors included in the security dot judgment result 1006 and the coordinate position information of the security dots, it is judged whether or not the extracted pixels are the security dots on each pixel at S1011 (step S1012). When it is judged as security dots (step S1012: Yes), the blending ratio re-calculated at step S1008 is set on the pixels extracted at step S1011 (step S1013). The RGB pixels are subjected to the monochrome conversion at the set blending ratio (step S1015). When a plurality of re-calculated blending ratios is included for each type of security dots, the blending ratio, which is set through the use of the security dot judgment result 1006, is selected. For example, in the case of the cyan security dots, the blending ratio re-calculated for cyan is selected.

When it is judged that the dots are not the security dots (step S1012: No), the blending ratio 1002 specified to the pixels extracted at step S1011 are set (step S1014). The RGB pixels are subjected to monochrome conversion at the set blending ratio (step S1015).

After processing as described above, at step S1016, it is judged whether the processing has been performed on every pixel. When the processing has not been performed yet, the pixels are extracted at step S1011 and the processing in the following the step is repeated. After the processing is performed on every pixel, a monochrome image 1017 is produced.

In the fourth embodiment, the security dot judgment at step S1005 is performed on the entire of the RGB image 1004. However, the security dot judgment may be performed on each pixel and the blending ratio is re-calculated corresponding to the result. Also, like the second embodiment, a procedure for calculating the blending ratio from the RGB image 1004 may be applied; or like the third embodiment, a procedure for obtaining the blending accuracy inherent to the device and for determining whether it is possible or not may be applied.

As described above, according to the processing of the fourth embodiment, based on the security dot judgment result 1006, it is determined whether or not the pixels are the security dots (S1012) on each pixel constituting the RGB image. And the monochrome conversion is performed at the re-calculated blending ratio on the pixels determined as security dots. When it is judged that the pixels are not the security dots, the monochrome conversion is performed at the specified blending ratio (S1015).

Therefore, according to the fourth embodiment, when scanning a color original to thereby form a monochrome image through the use of the image processing apparatus mounted with the color scanner, the reproduction of a specific color included in the original can be enhanced. At that time, even when any security dots intended to be invisible are included in the original, by dynamically changing the blending ratio, the dots are suppressed from being reproducible visibly. Further, by changing the blending ratio of the respective pixels through the use of the security dot judgment result, the blending ratio specified by a user can be set on the area other than the security dots. Therefore, the user-specified blending ratio can be applied to the area other than the security dots of the image data while suppressing the security dots from being reproducible visibly. Also, by setting the blending ratio on each pixel, the blending ratio can be changed at monochrome conversion by preparing plural kinds of re-calculated blending ratios corresponding to the kinds of the security dots.

Embodiment 5

A fifth embodiment describes an embodiment in which the security dot judgment is applied to remote copying.

In the first embodiment, the second embodiment, the third embodiment and the fourth embodiment, the process from the security dot judgment, the blending ratio re-calculation to the monochrome conversion is performed by a single image processing apparatus such as an MFP. The fifth embodiment describes a mode of embodiment in which, a plurality of image processing apparatuses is provided to enable remote copying, and each of two image-processing apparatuses has a monochrome conversion unit respectively.

Figure 11:
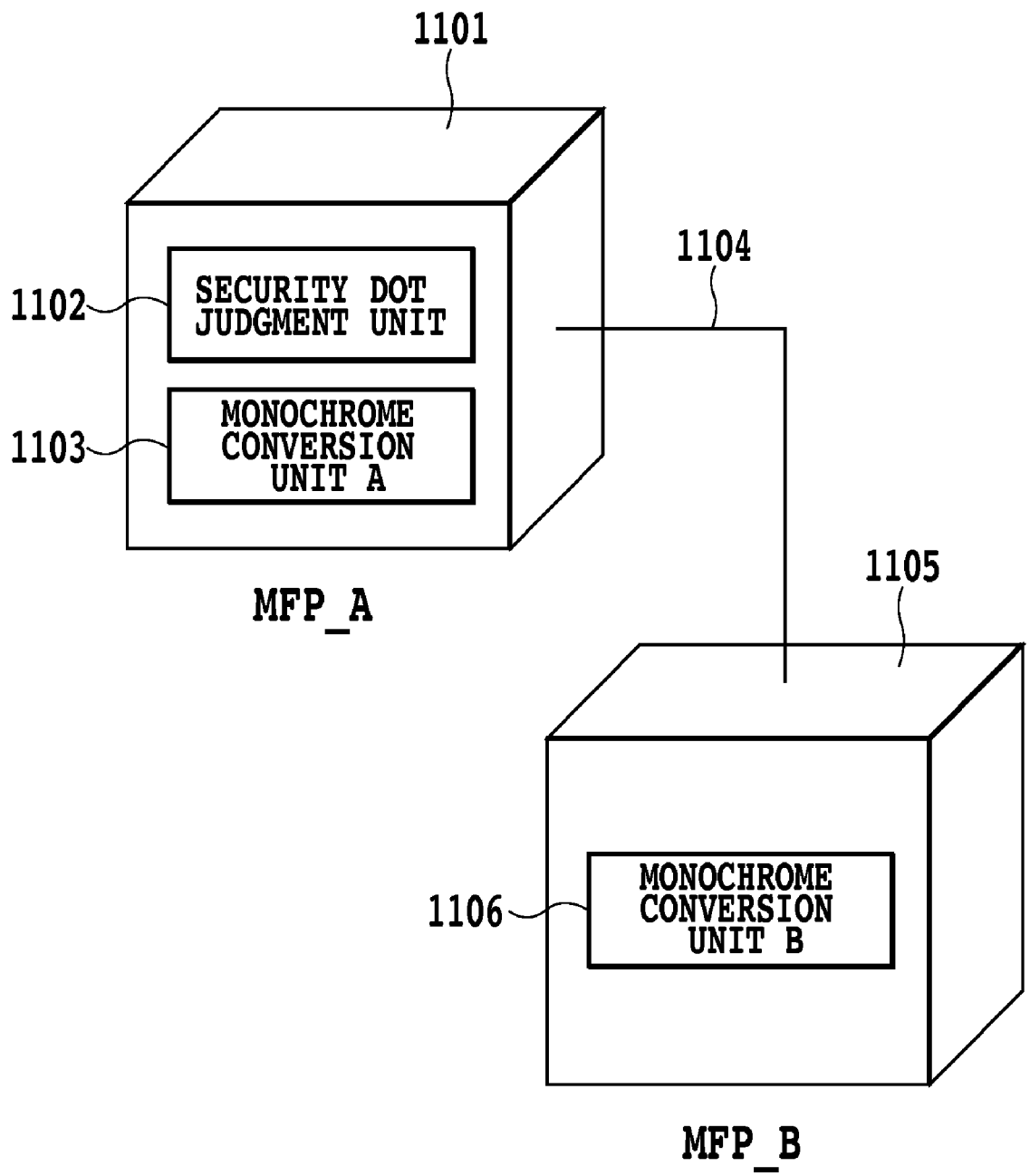
FIG. 11 illustrates an example of configuration for a remote copy according to a fifth embodiment of the invention.

FIG. 11 illustrates a configuration of a system according to the fifth embodiment. An MFP_A 1101 denotes an MFP having the same configuration as that shown in FIG. 1. The data processing unit 105 is equipped with a security dot judgment unit 1102 and a monochrome conversion unit A 1103 as described in the above embodiments. The performance of the monochrome conversion unit A1103 depends on the blending accuracy in table 801 shown in FIG. 8.

LAN (Local Area Network) 1104 is an interface connecting the MFP_A 1101 as a first image processing apparatus and an MFP_B 1105 as a second image processing apparatus. Between the MFP_A 1101 and the MFP_B 1105, various kinds of data such as color image and command are transmitted and received via the network I/F 107 (refer to FIG. 1) provided to the respective MFPs and the LAN 1104. That is, the network I/F 107 and the LAN 1104 function as units to obtain a color image for the MFP_A 1101 or MFP_B 1105.

The MFP_B 1105 includes a monochrome conversion unit B 1106. The monochrome conversion unit A 1103 and the monochrome conversion unit B 1106 have different blending accuracy each other. Under circumstances capable of performing remote copying, for example, it is possible to perform the security dot judgment on an image taken by the scanner unit 101 mounted on the MFP_A 1101; and then, the data is transmitted through the use of the LAN 1104 to output at the printer unit 103 of the MFP_B 1105.

In the fifth embodiment, the MFP_A that takes the image data with the scanner unit 101 and transmits the data is defined as the transmitting side and the MFP_B that receives the transmitted image data and prints out the data is defined as the receiving side. The MFP according to the fifth embodiment has a monochrome conversion function in a transmitting section and a receiving section thereof, and is capable of selecting MFP that performs the monochrome conversion responding to the conditions.

Figure 12:
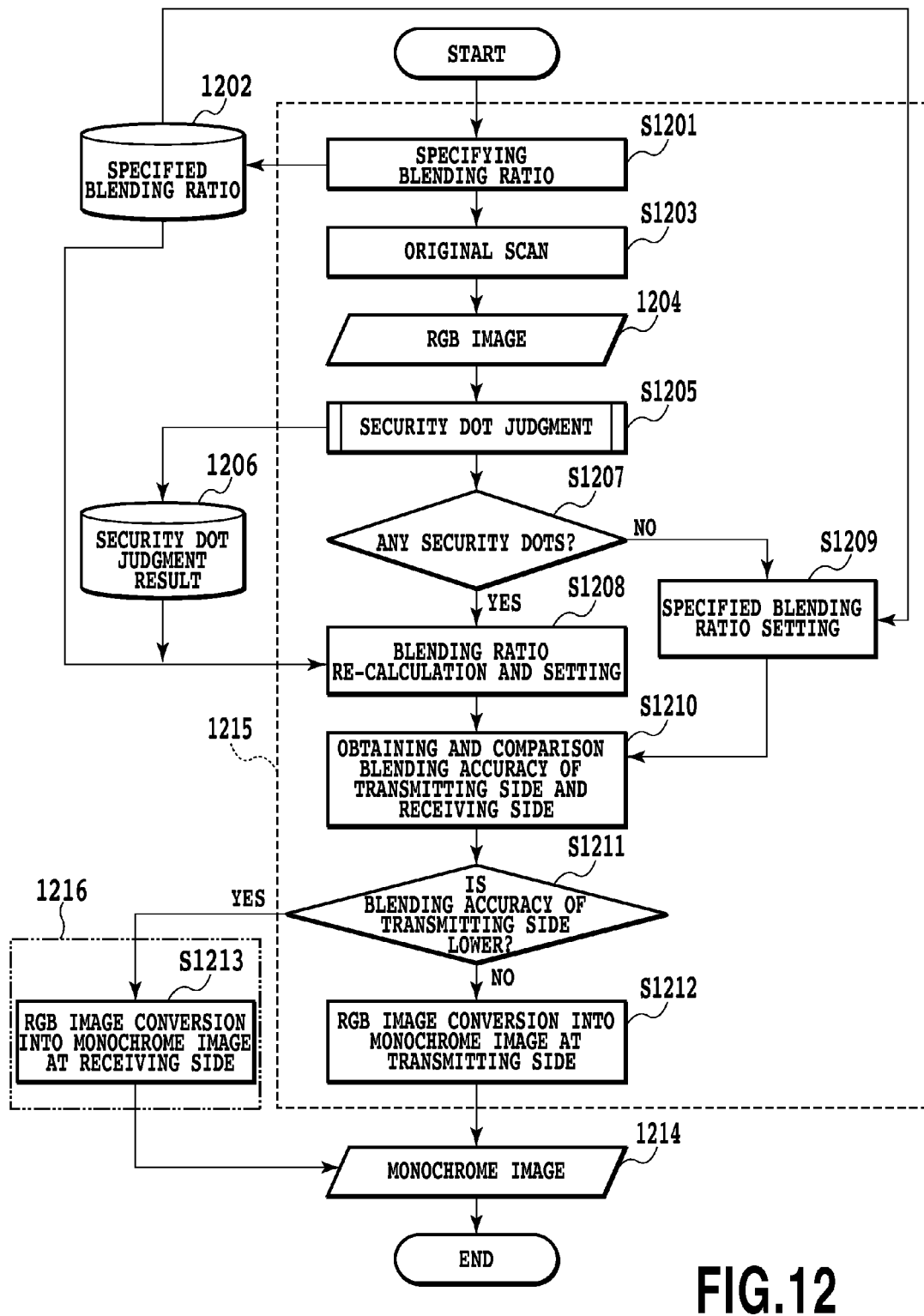
FIG. 12 illustrates a processing flow according to the fifth embodiment of the invention.

A flow according to the fifth embodiment is described below. FIG. 12 illustrates the processing flow according to the fifth embodiment. Each of the control units mounted on the data processing unit 105 of the MFP_A 1101 and the MFP_B 1105 controls the process. Each of the control units reads a program for performing the process shown in FIG. 12 stored in each memory unit 102 and executes the program.

The security dot judgment at step S1205 is the same as the processing from step S205 to step S214 in the first embodiment. Therefore, the processing flow, from the specification of the blending ratio at step S1201 to the setting of the specified blending ratio at step S1209, is the same as the processing flow from step S201 to step S218 in the first embodiment. That is, the process from step S1201 to S1209 is performed by the data processing unit 105 on the MFP_A 1101. In the processing after step S1210, the processing other than step S1213 is performed by the data processing unit 105 on the MFP_A 1101; the processing at step S1213 is performed by the data processing unit 105 on the MFP_B 1105.

After the re-calculating and the setting of the blending ratio at step S1208; or after setting of the blending ratio specified at step S1209, at step S1210, the blending accuracy inherent to the transmitting side and the receiving side is obtained and compared. For example, the blending accuracy shown in table 801 in FIG. 8 is obtained and bit numbers are compared between the transmitting side and the receiving side.

When obtaining the blending accuracy of the receiving side (MFP_B 1105), the control unit of the MFP_A 1101 transmits a command to the MFP_B 1105 to cause the MFP_B 1105 to transmit the blending accuracy inherent to the MFP_B 1105 to the MFP_A 1101. Receiving the command, the MFP_B 1105 transmits the blending accuracy held in the memory unit 102 of the MFP_B 1105 to the MFP_A 1101. Thus, the MFP_A 1101 obtains the blending accuracy inherent to the MFP_B 1105.

At step S1211, it is judged whether the blending accuracy at the transmitting side is lower. When the blending accuracy at the transmitting side is not lower, at step S1212, the RGB image is subjected to the monochrome conversion at the transmitting side to produce a monochrome image 1214. The processing from step S1201 to step S1212 is a process 1215 performed at the transmitting side.

When it is judged, at step S1211, that the blending accuracy at the transmitting side is lower, after transmitting the RGB image 1204 to the receiving side at step S1213, the monochrome conversion is performed at the receiving side to thereby produce a monochrome image 1214. The processing at the step S1213 is a processing 1216 performed at the receiving side.

According to the fifth embodiment, same as the first embodiment, the blending ratio is specified by a user. However, same as the second embodiment, the blending ratio may be calculated based on the image data scanned from the original. Also, like the fourth embodiment, the blending ratio for each pixel may be changed. The fifth embodiment shows an example in which the monochrome conversion unit is provided at both of the transmitting side and the receiving side. This method may be applied to the case where the monochrome conversion unit is provided at either one of the transmitting side and the receiving side. In this case, at step S1211, it is judged that the accuracy of the side without the monochrome conversion unit is lower.

As described above, according to the fifth embodiment, when performing a scan operation like monochrome copy on a color original through the use of the image processing apparatus mounted with the color scanner, the reproduction of a specific color in the original can be enhanced. At that time, when security dots intended to be invisible are included in the original, the dots can be suppressed from being reproducible visibly by dynamically changing the blending ratio. Further, under a circumstance where the remote copying is possible, when the monochrome conversion unit is provided at both of the transmitting side and the receiving side, by comparing the blending accuracy inherent to the both sides, and performing the processing at the side having higher accuracy, the specified or re-calculated blending ratio can be reproduced more precisely.

Embodiment 6

A sixth embodiment is described below. In the embodiment 6, in the remote copying, when the security dot judgment is applied, the transmitting side has the priority to perform the processing first.

In the first embodiment, the second embodiment, the third embodiment and the fourth embodiment, a single MFP performs the processing of the security dot judgment, the blending ratio re-calculation, and the monochrome conversion. Also, in the fifth embodiment, under a circumstance where the remote copying is possible, the blending accuracy of the transmitting side and the receiving side is compared, and the processing is performed at the side that has higher blending accuracy. However, when the remote copying is performed actually, the performance of the processing varies depending on the data size. When a smaller monochrome image is transmitted to perform the remote copying, the performance is better than the case where RGB image is transmitted to perform the remote copying. The sixth embodiment describes an embodiment in the case where the processing is preferably performed at the transmitting side first, when performing the monochrome conversion under circumstances where the remote copying is possible.

Figures 13, 13A:
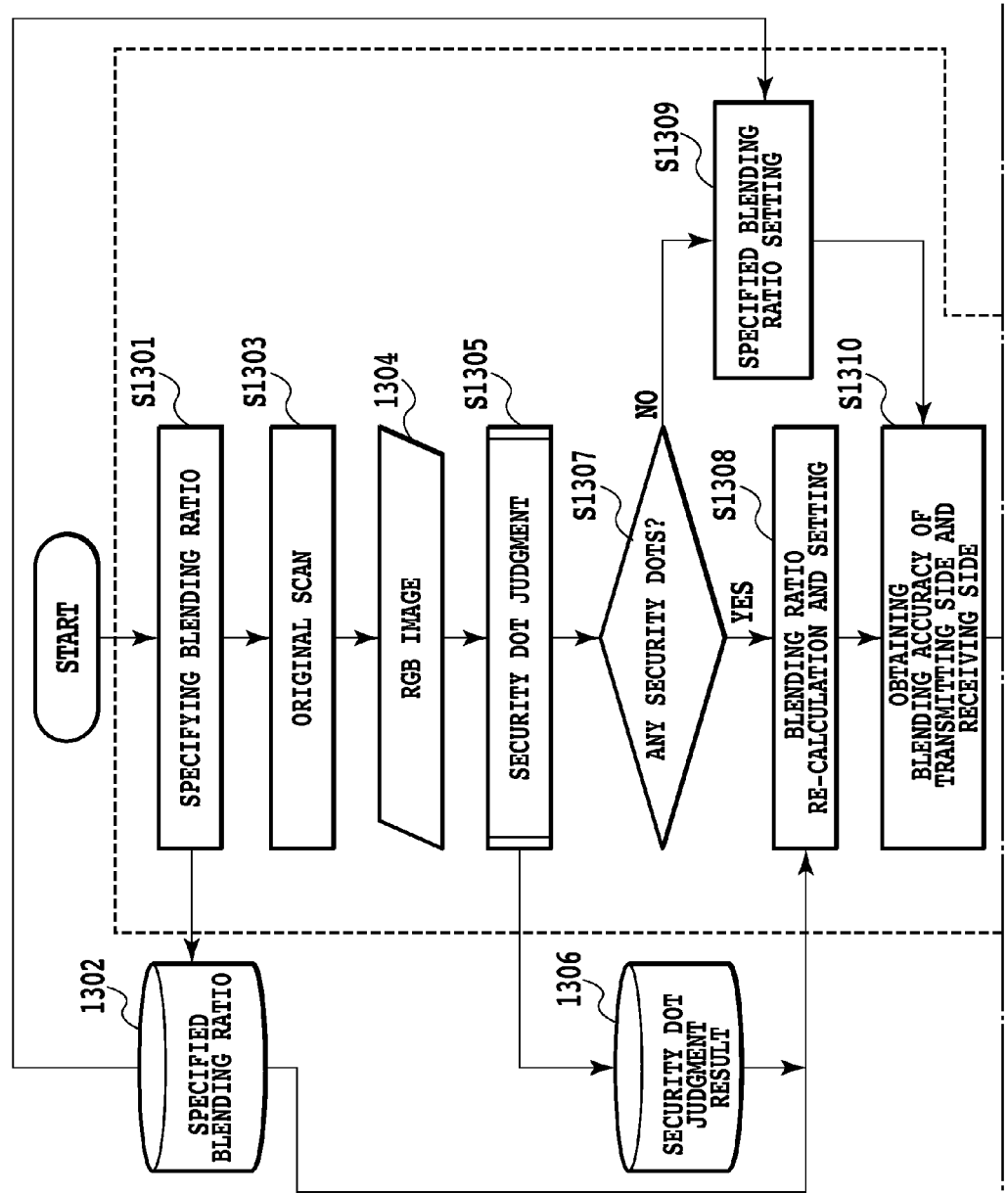
FIG. 13 illustrates a flow showing the relationship of FIG. 13A and FIG. 13B.
FIG. 13A illustrates a processing flow according to a sixth embodiment of the invention.
Figure 13B:
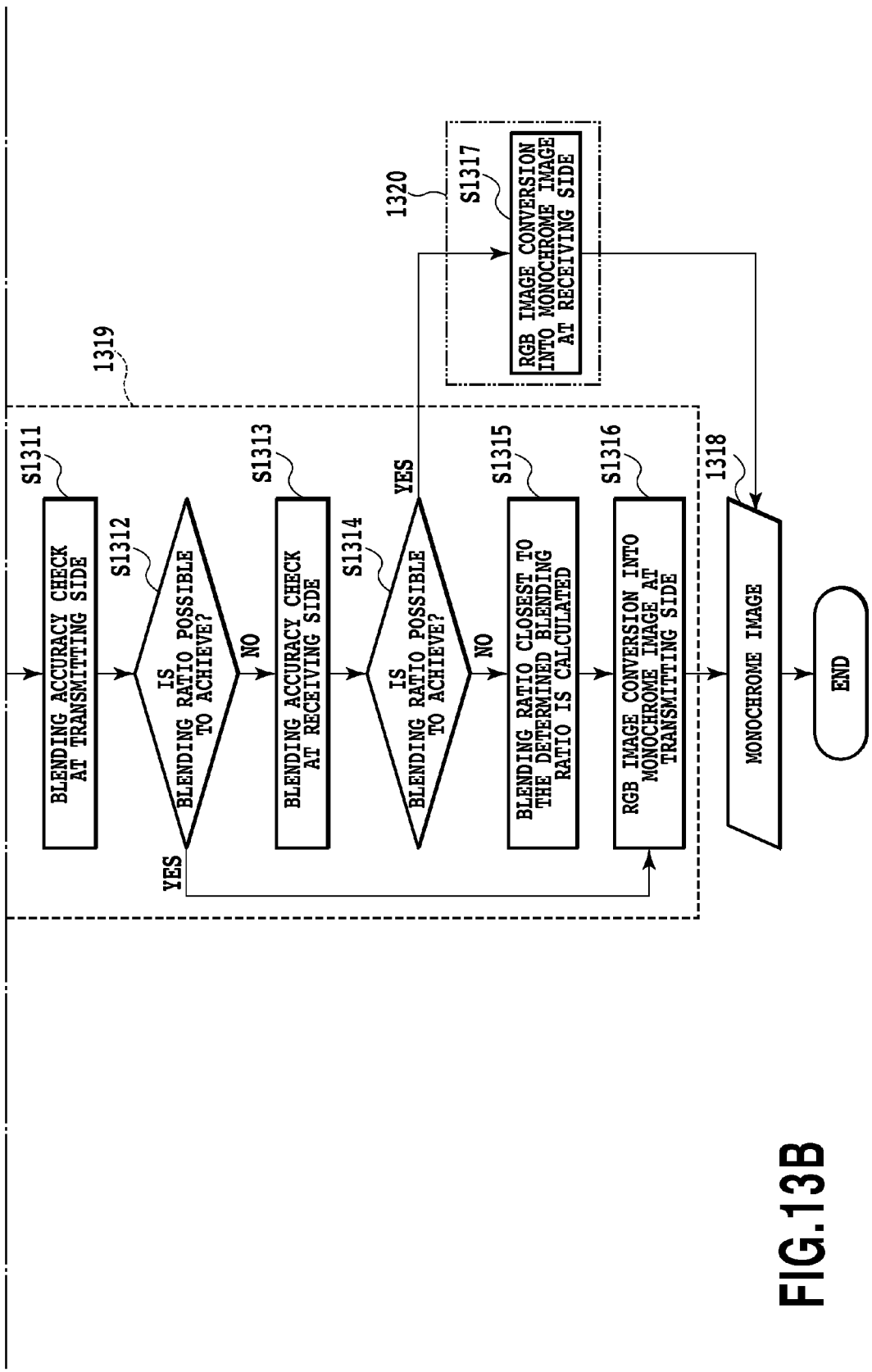
FIG. 13B illustrates a processing flow according to a sixth embodiment of the invention.

FIG. 13A and FIG. 13B illustrate a processing flow according to the sixth embodiment. The control unit mounted on the data processing unit 105 controls the processing. The control unit reads a program for executing a process shown in FIG. 13A and FIG. 13B stored in the memory unit 102 and executes the program.

The security dot judgment at step S1305 is the same as the processing from step S205 to step S214 in the first embodiment. Therefore, the processing flow from the specification of the blending ratio at step S1301 to the setting of the specified blending ratio at step S1309 is the same as the processing flow from step S201 to step S218 in the first embodiment. The processing steps after step S1310 is performed by the data processing unit 105.

After the re-calculation of the blending ratio and the setting the same at step S1308, or after the setting of the specified blending ratio at step S1309, at step S1310, the blending accuracy inherent to the transmitting side and the receiving side is obtained. In the above fifth embodiment, the blending accuracy is compared. However, in the sixth embodiment, the blending accuracy is not compared.

At step S1311, the blending accuracy inherent to the transmitting side is checked, and at step S1312, it is judged whether the set blending ratio is possible. When it is judged that the blending ratio is possible, at step S1316, the RGB image 1304 is subjected to the monochrome conversion at the transmitting side to thereby produce a monochrome image 1318. When it is judged as impossible at step S1312, at step S1313, the blending accuracy inherent to the receiving side is checked and judged whether blending ratio is possible at step S1314. When it is judged as impossible, at step S1315, the blending ratio closest to the determined blending ratio is calculated in the blending ratio possible at the transmitting side. At step S1316, the RGB image 1304 is subject to the monochrome conversion at the calculated blending ratio to thereby produce the monochrome image 1318. The process from step S1301 to step S1316 is a process 1319 performed at the transmitting side.

When it is judged as possible at step S1314, at step S1317, the RGB image 1304 is transmitted to the receiving side, and the monochrome conversion is performed at the receiving side to thereby produce the monochrome image 1318. The processing at step S1317 is a processing 1320 performed at the receiving side.

According to the sixth embodiment, like the first embodiment, a user specifies the blending ratio. However, same as the second embodiment, the blending ratio may be calculated based on the image data scanned from the original. Also, like the fourth embodiment, the blending ratio for each pixel may be changed.

According to the sixth embodiment, when scanning a color original into monochrome copy through the use of the image processing apparatus mounted with the color scanner, the reproduction of a specific color in the original can be enhanced. At that time, even when security dots intended to be invisible are included in the original, by dynamically changing the blending ratio, the dots can be suppressed from being reproducible visibly. Further, under circumstances capable of remote copying, when the monochrome conversion unit is provided at both of the transmitting side and the receiving side, the performance of the remote copying can be increased by performing the monochrome conversion at the transmitting side first.

Embodiment 7

In the above embodiments, methods for obtaining a color image with a scanner unit 101 as the obtaining unit of the color image (RGB image) have been described. However, the method for obtaining the color image is not limited to the above.

For example, the color image may be obtained by receiving from an external unit like a PC connected over a network or the like via the network I/F 107. Also, the image processing apparatus may be provided with a device for obtaining the color image from a recording medium such as a magnetic disk drive, an optical disk drive or a memory card reader.

Embodiment 8

Furthermore, as another embodiment, the invention may be applied to a system including a plurality of devices (for example, a computer, an interface device, a reader, a printer or the like), or to a system composed of single apparatus (a complex machine, a printer, facsimile machine or the like).

In order to perform the above-described functions of the embodiments, the above-described embodiments includes the following processing method in which a program for causing the above-described constitution of the embodiments to operate may be stored in a storing medium, the program stored in the storing medium may be read out as a code and be executed on a computer. That is, the embodiments include a computer-readable storing medium in the scope of the invention. Furthermore, not only the storing medium having the above-described computer-readable computer program stored therein, but also the computer readable program itself is also included in the above-described embodiments.

As for the storing medium, for example, a floppy disk (registered trade mark), a hard disk, an optical disk, a magnetic optical disk, a CD-ROM, a magnetic tape, a non-volatile memory card or a ROM may be employed.

Furthermore, not only a method in which the processing is executed by a single program stored in one other software of the above-described storing media, but also a method in which the operation of the above embodiments is executed on an OS in cooperation with a function of another software or an expanded board is also included in the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-181414, filed Jul. 11, 2008, which is hereby incorporated by reference herein in its entirety.

What is claimed is:

1. An image processing apparatus, comprising:
a judgment unit that judges whether a color image includes security dots;
a calculation unit that calculates a blending ratio to blend each color element of the color image when the judgment unit judges that security dots are included in the color image, wherein the blending ratio is calculated so that the security dots are reproduced in a manner that is substantially undetectable by the human eye when a monochrome image into which the color image is converted is output on a print medium; and
a converting unit that converts the color image into a monochrome image at the blending ratio calculated by the calculation unit.

2. The image processing apparatus according to claim 1, further comprising:
a separating unit that separates the color image into a plurality of image data of respective color elements; and
an isolated point judgment unit that judges whether any isolated points are included in the image data separated into respective color elements by the separating unit,
wherein the judgment unit judges whether or not the security dots are included based on a judgment result made by the isolated point judgment unit.

3. The image processing apparatus according to claim 2, wherein the judgment unit judges whether or not any security dots are included in each of the image data separated by the separating unit based on a plurality of isolated point judgment results made by the isolated point judgment unit on each of the color elements.

4. The image processing apparatus according to claim 1, wherein the calculation unit calculates the blending ratio based on a security dot representative signal value which is a signal value indicating a typical color of the security dots included in the color image.

5. The image processing apparatus according to claim 1, further comprising:
a unit that, when the judgment unit judges that no security dots are included, converts the color image into a monochrome image at the blending ratio specified by a user.

6. The image processing apparatus according to claim 1, wherein the blending ratio is calculated based on a result of analyzing the color image.

7. The image processing apparatus according to claim 6, wherein the analyzing is performed based on a histogram calculated with respect to a color constituting the color image.

8. The image processing apparatus according to the claim 1, further comprising:
a unit that obtains a blending accuracy, which is information about blending ratio accuracy possible for the image processing apparatus; and
a judging unit that judges whether the color image can be converted into a monochrome image at the calculated blending ratio based on the obtained blending accuracy,
wherein the calculation unit, when the judging unit for judging whether the conversion is possible or not judges that conversion is not possible at the calculated blending ratio, re-calculates the blending ratio to a value corresponding substantially to the calculated blending ratio from among the possible blending ratios in the obtained blending accuracy,
and the converting unit that converts the color image into a monochrome image converts the color image into a monochrome image at the re-calculated blending ratio.

9. The image processing apparatus according to claim 8, wherein the calculation unit re-calculates the blending ratio in accordance with a color type of the security dots included in the color image and a security dot-reproducing threshold.

10. The image processing apparatus according to the claim 1, wherein
the judgment unit further judges coordinates in the color image of the security dots included in the color image,
the calculation unit calculates the blending ratio of the pixels of the security dots judged by the judgment unit in the pixels of the color image, and
the converting unit that converts the color image into a monochrome image converts each of the pixels into a monochrome image using the coordinate judged by the judgment unit at the blending ratio calculated on the pixels if it is judged that the security dots are included.

11. The image processing apparatus according to claim 1, wherein said image processing apparatus is connected with a second image processing apparatus, and is capable of performing remote copying of image data obtained by said image processing apparatus through the use of the second image processing apparatus, said image processing apparatus further comprising:
a unit that obtains a blending accuracy inherent to said image processing apparatus and a blending accuracy inherent to the second image processing apparatus; and
a unit that compares the blending accuracy inherent to said image processing apparatus and the blending accuracy inherent to the second image processing apparatus,
wherein, if as a result of the comparison, it is determined that the second image processing apparatus has a higher blending accuracy, the converting of the color image into a monochrome image is performed at the calculated blending ratio in the second image processing apparatus.

12. The image processing apparatus according to claim 1, wherein said image processing apparatus is connected to a second image processing apparatus, and is capable of performing remote copying of image data obtained by said image processing apparatus through the use of the second image processing apparatus, said image processing apparatus further comprising:
a unit that obtains a blending accuracy inherent to said image processing apparatus and a blending accuracy inherent to the second image processing apparatus; and
a unit that judges whether it is possible to convert the color image into a monochrome image at the calculated blending ratio with reference to the blending accuracy inherent to said image processing apparatus,
wherein, when it is judged that the conversion is possible, said image processing apparatus converts the color image into a monochrome image at the calculated blending ratio, and
wherein, when it is judged that the conversion is not possible at the calculated blending ratio in said image processing apparatus, the image processing apparatus judges whether the second image processing apparatus can convert the color image into a monochrome image at the calculated blending ratio with reference to the blending accuracy inherent to the second image processing apparatus,
when the conversion is possible at the calculated blending ratio in the second image processing apparatus, the second image processing apparatus is configured to convert the color image into a monochrome image at the calculated blending ratio, and
when the conversion is impossible at the calculated blending ratio in the second image processing apparatus, the image processing apparatus re-calculates the calculated blending ratio, and converts the color image into a monochrome image at the re-calculated blending ratio.

13. The image processing apparatus according to claim 1, wherein the calculation unit includes a color determination unit that determines a color of the security dots, and calculates a blending ratio to blend each color element of the color image on the basis of the color of the security dots determined by the color determination unit.

14. An image processing method in an image processing apparatus, comprising the steps of:
judging whether the color image includes any security dots;
calculating a blending ratio to blend each color element of the color image according to the color of the security dots judged to be included in the color image, the blending ratio being calculated so that the security dots are reproduced in a manner that is substantially undetectable by the human eye when a monochrome image into which the color image is converted is output on a print medium; and
converting the color image into a monochrome image at the calculated blending ratio.

15. A non-transitory computer-readable recording storage medium storing computer-executable instructions which, when run on a computer, cause said computer to perform an image processing method in an image processing apparatus, the instructions comprise:

instructions to judge whether the color image includes any security dots;

instructions to calculate a blending ratio to blend each color element of the color image according to the color of the security dots judged to be included in the color image, wherein the blending ratio is calculated so that the security dots are reproduced in a manner that is substantially undetectable by the human eye when a monochrome image into which the color image is converted is output on a print medium; and instructions to convert the color image into a monochrome image at the calculated blending ratio.

* * * * *